United States Patent
Okuma

(10) Patent No.: US 11,872,655 B2
(45) Date of Patent: Jan. 16, 2024

(54) LASER PROCESSING DEVICE

(71) Applicant: HAMAMATSU PHOTONICS K.K., Hamamatsu (JP)

(72) Inventor: Junji Okuma, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 198 days.

(21) Appl. No.: 17/257,606

(22) PCT Filed: Jul. 1, 2019

(86) PCT No.: PCT/JP2019/026166
§ 371 (c)(1),
(2) Date: Jan. 4, 2021

(87) PCT Pub. No.: WO2020/009072
PCT Pub. Date: Jan. 9, 2020

(65) Prior Publication Data
US 2021/0268607 A1    Sep. 2, 2021

(30) Foreign Application Priority Data
Jul. 5, 2018  (JP) ................. 2018-128476

(51) Int. Cl.
*B23K 26/38* (2014.01)
*B23K 26/06* (2014.01)
(Continued)

(52) U.S. Cl.
CPC ............ *B23K 26/38* (2013.01); *B23K 26/032* (2013.01); *B23K 26/0643* (2013.01);
(Continued)

(58) Field of Classification Search
CPC .. B23K 26/073; B23K 26/0736; B23K 26/38; B23K 26/0643; B23K 26/0648; B23K 26/0622; B23K 26/083
See application file for complete search history.

(56) References Cited

U.S. PATENT DOCUMENTS

2003/0019852 A1*  1/2003  Kaplan ................. G06K 1/126
                                                 219/121.68
2006/0169677 A1   8/2006  Deshi
(Continued)

FOREIGN PATENT DOCUMENTS

CN       101233449 A     7/2008
CN       101288024 A    10/2008
(Continued)

OTHER PUBLICATIONS

H.A. Eltawahni, High Power CO2 Laser Cutting for Advanced Materials- Review, 2016, Reference Module in Materials Science and Materials Engineering, p. 1 of 2.2.2 Reflectivity (Year: 2016).*
(Continued)

*Primary Examiner* — John J Norton
*Assistant Examiner* — Franklin Jefferson Wang
(74) *Attorney, Agent, or Firm* — Faegre Drinker Biddle & Reath LLP

(57) ABSTRACT

Disclosed is a laser processing device including a laser light source configured to output laser light, a converging unit configured to converge the laser light toward a first surface to form a converging point, a camera configured to image reflected light of the laser light from the first surface, a spatial light modulator for modulating the laser light according to a modulation pattern, and a controller configured to execute acquisition processing of applying the laser light to the first surface by controlling the laser light source and imaging the reflected light by controlling the camera to
(Continued)

acquire a reflectance of the first surface for the first wavelength.

2 Claims, 28 Drawing Sheets

(51) Int. Cl.
  *B23K 26/03* (2006.01)
  *B23K 26/073* (2006.01)
  *B23K 26/08* (2014.01)
  *B23K 26/0622* (2014.01)
  *B23K 101/40* (2006.01)

(52) U.S. Cl.
  CPC ...... *B23K 26/0648* (2013.01); *B23K 26/0736* (2013.01); *B23K 26/083* (2013.01); *B23K 26/0622* (2015.10); *B23K 2101/40* (2018.08)

(56) References Cited

U.S. PATENT DOCUMENTS

| | | | | |
|---|---|---|---|---|
| 2007/0182954 | A1* | 8/2007 | Togawa | B23K 26/0853 356/237.1 |
| 2010/0103962 | A1* | 4/2010 | Ando | G01J 1/08 372/50.1 |
| 2012/0276754 | A1 | 11/2012 | Cordingley et al. | |
| 2014/0302247 | A1* | 10/2014 | Inaba | B23K 26/0608 427/493 |
| 2017/0291258 | A1* | 10/2017 | Izumi | B23K 26/705 |
| 2018/0215649 | A1* | 8/2018 | Wada | B23K 26/60 |

FOREIGN PATENT DOCUMENTS

| | | | | |
|---|---|---|---|---|
| CN | 101522362 | A | 9/2009 | |
| CN | 101673666 | A | 3/2010 | |
| CN | 102699526 | A | 10/2012 | |
| CN | 102741011 | A | 10/2012 | |
| CN | 103706950 | A | 4/2014 | |
| CN | 104852269 | A | 8/2015 | |
| CN | 105392591 | A | 3/2016 | |
| CN | 107283049 | A | 10/2017 | |
| CN | 207071747 | A | 3/2018 | |
| FR | 2745214 | A1 * | 8/1997 | .......... B23K 26/066 |
| JP | H11-271823 | A | 10/1999 | |
| JP | 2004-532520 | | 10/2004 | |
| JP | 3878758 | B2 | 2/2007 | |
| JP | 2008-238195 | A | 10/2008 | |
| JP | 2009-082966 | A | 4/2009 | |
| JP | 5902529 | B2 | 4/2016 | |
| JP | 2016-123980 | A | 7/2016 | |
| JP | 2017-131966 | A | 8/2017 | |
| JP | 2017-159333 | A | 9/2017 | |
| KR | 20130121719 | A * | 11/2013 | |
| KR | 20150114328 | A * | 10/2015 | |
| TH | 150887 | A | 3/2016 | |
| TW | 201105444 | A | 2/2011 | |
| TW | 201738026 | A | 11/2017 | |
| WO | WO 02/078896 | A1 | 10/2002 | |
| WO | WO 2012/169560 | A1 | 12/2012 | |
| WO | WO-2018038347 | A2 * | 3/2018 | .......... B23K 26/064 |
| WO | WO 2019/093209 | A1 | 5/2019 | |
| WO | WO 2019/198513 | A1 | 10/2019 | |

OTHER PUBLICATIONS

International Preliminary Report on Patentability dated Jan. 14, 2021 for PCT/JP2019/026166.

* cited by examiner

*Fig.17*
(a)
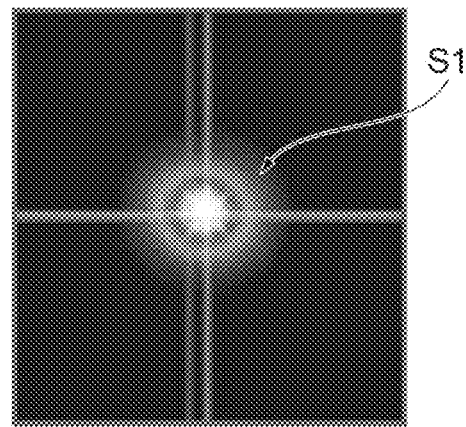
(b)
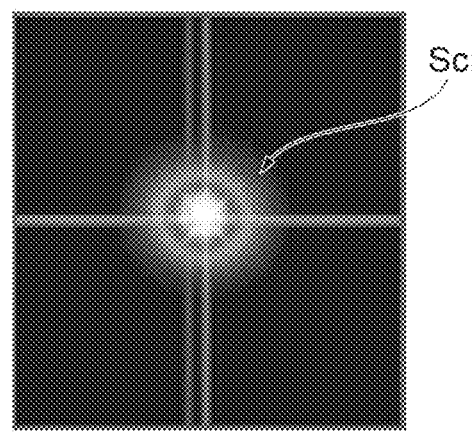

*Fig.19* (a)
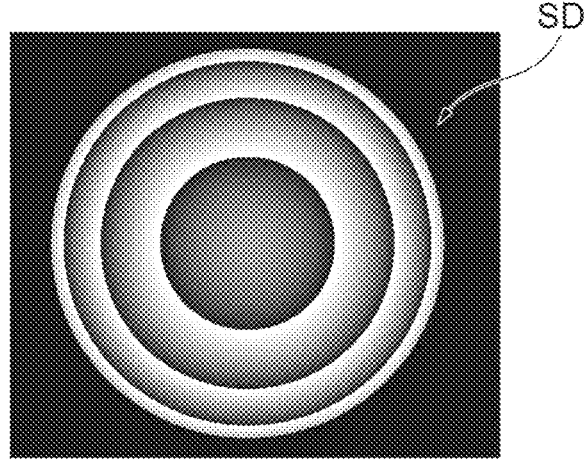
(b)
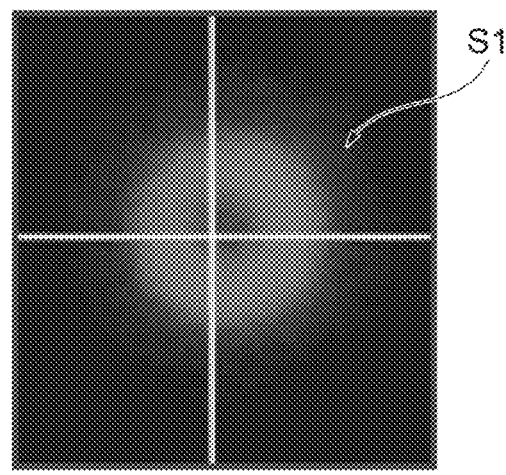
(c)
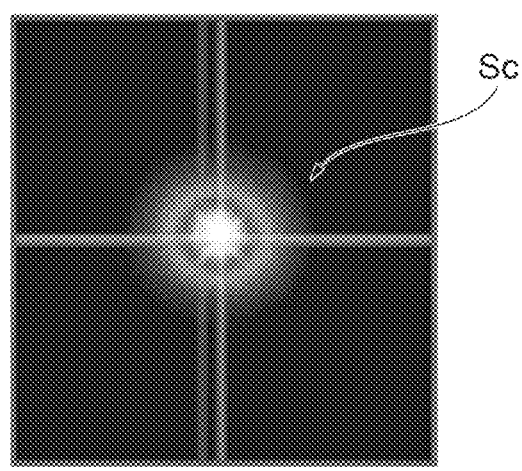

Fig.21
(a)
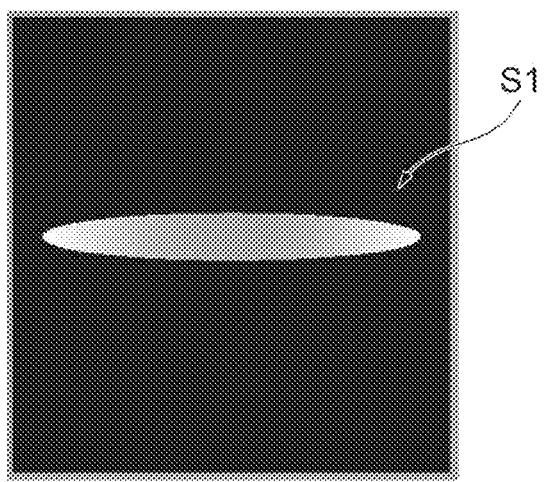
(b)
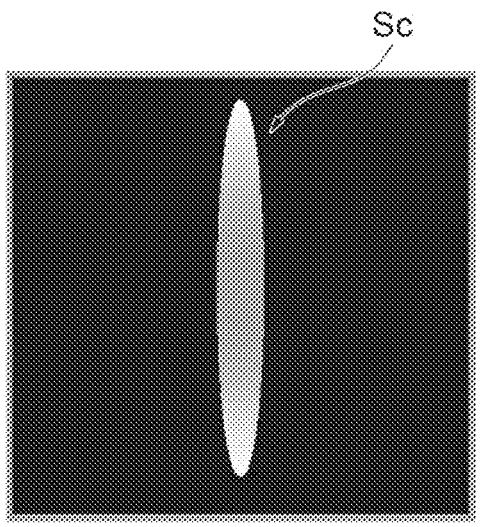

*Fig.22*
(a)
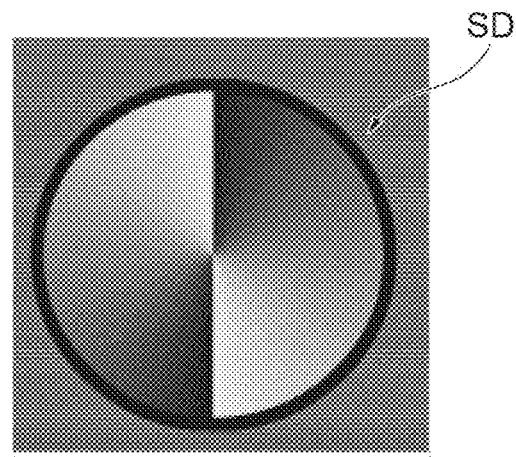
(b)
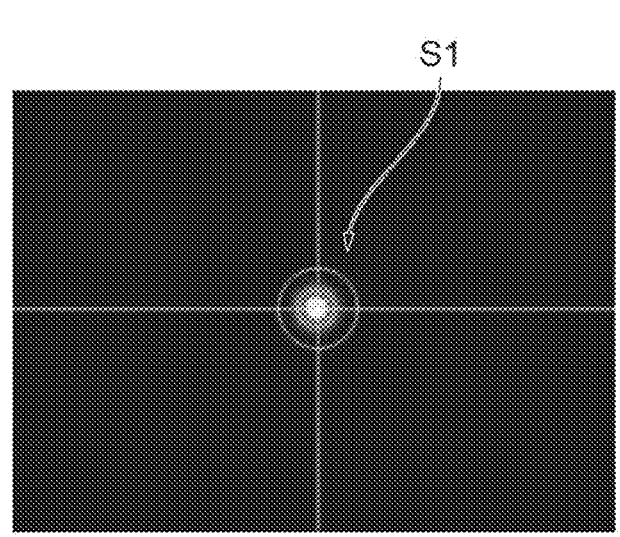

Fig.23 (a)
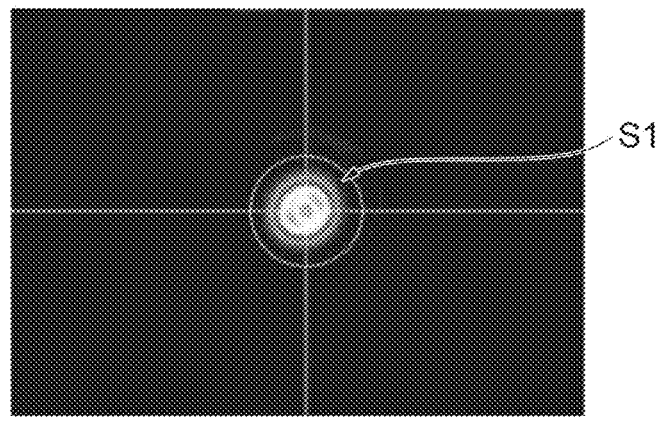
(b)
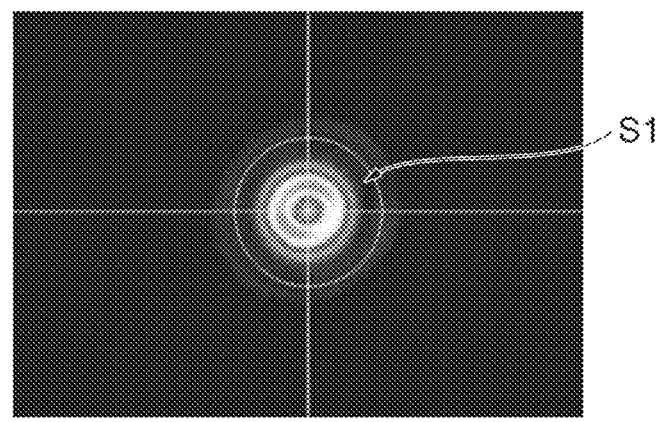
(c)
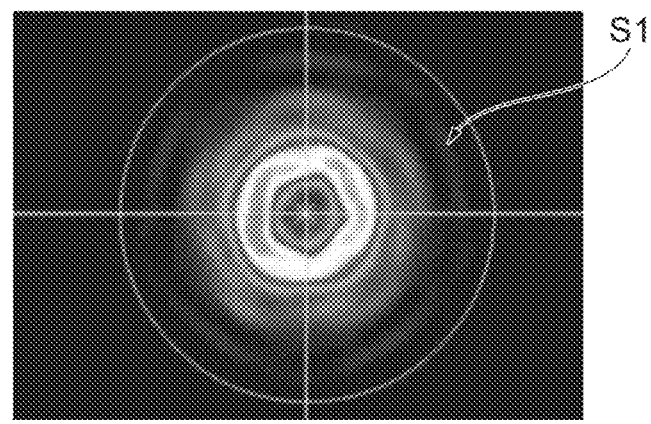

Fig.24
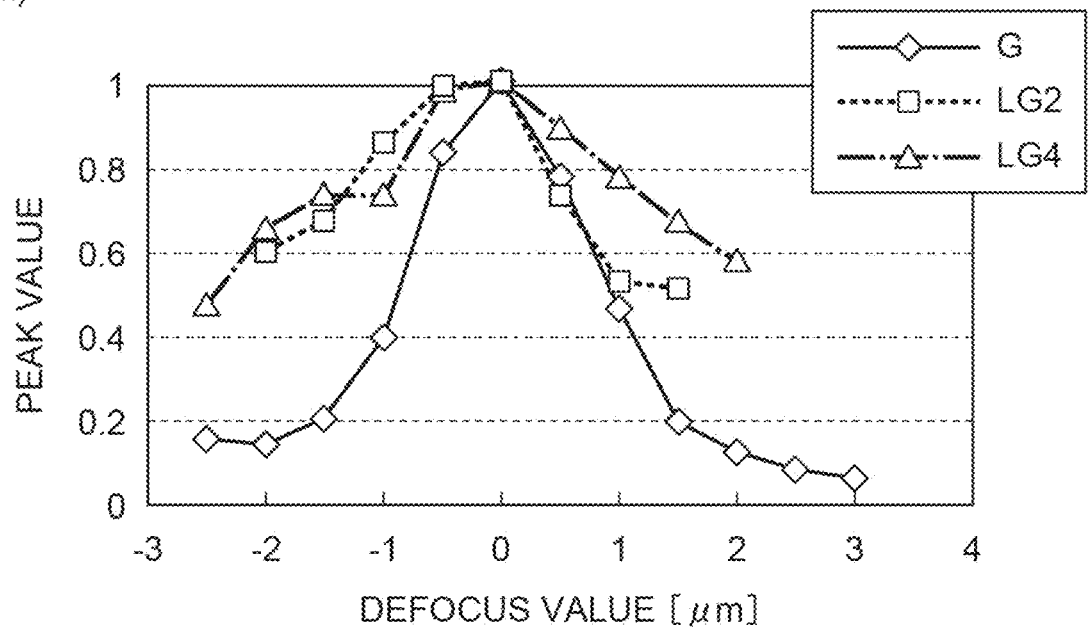
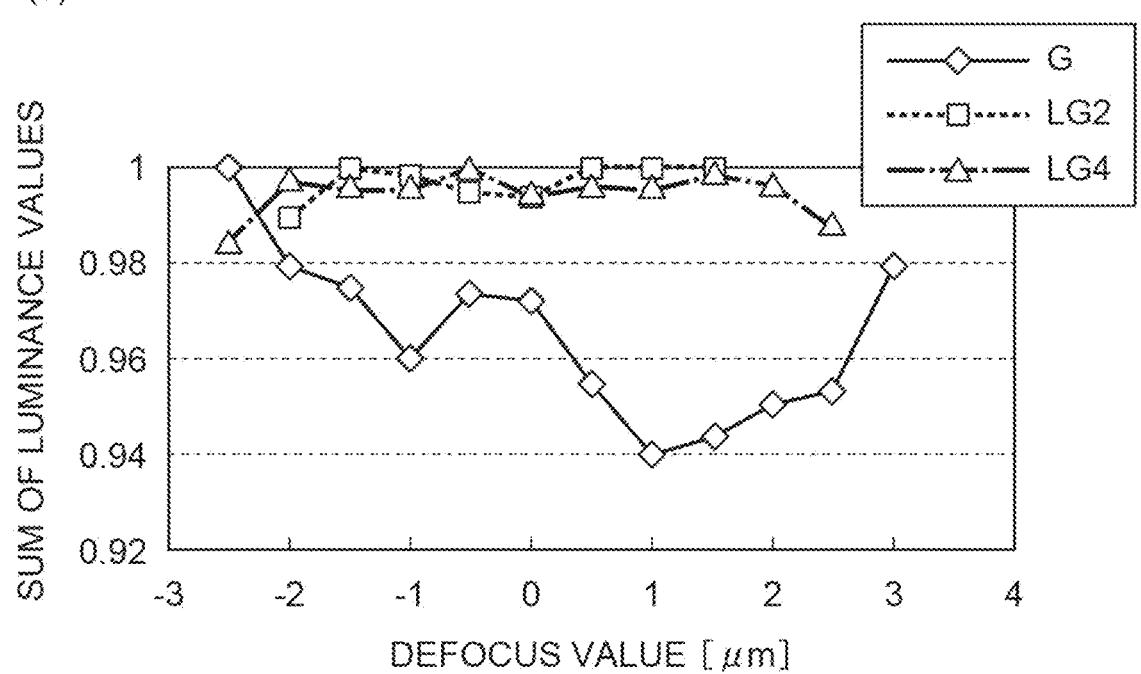

Fig.25
(a)
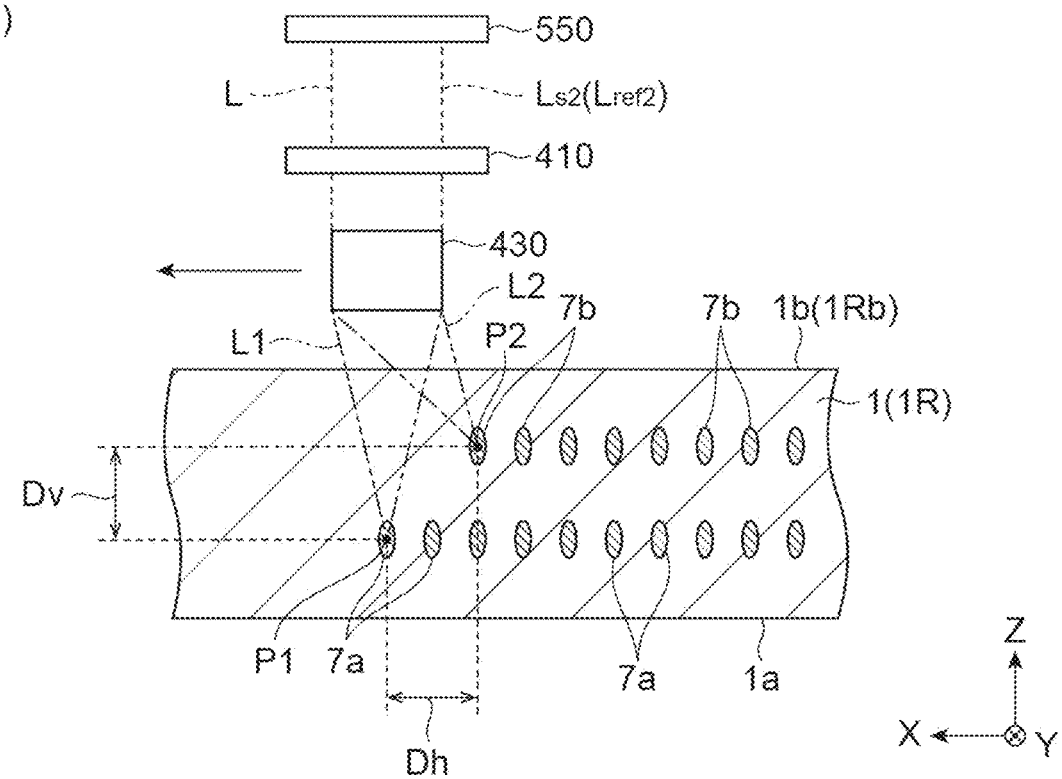
(b)
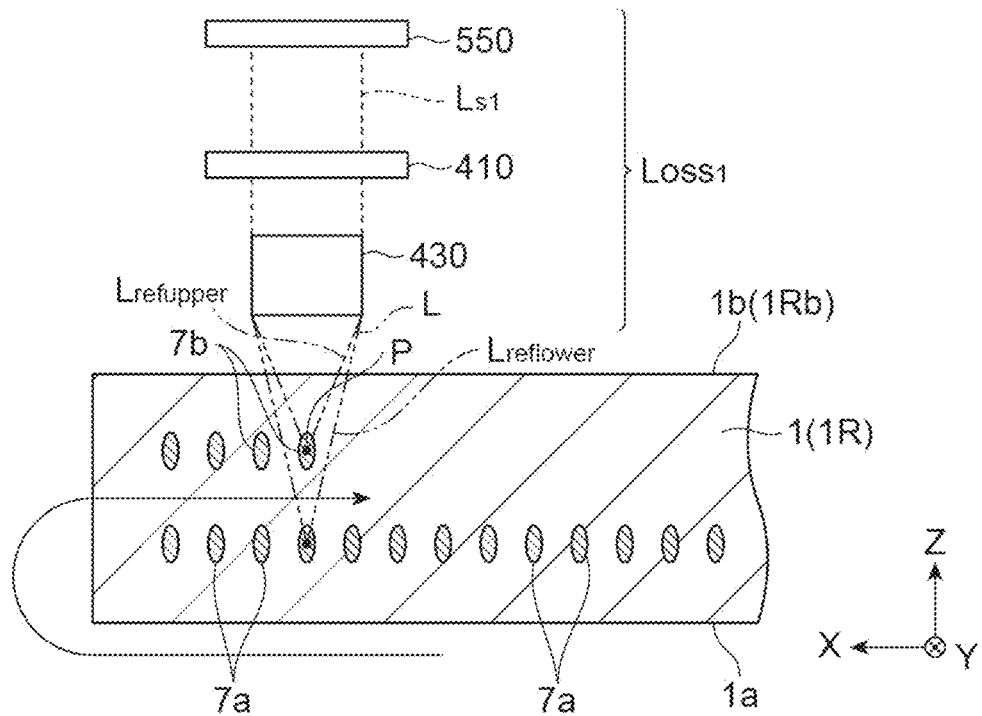

LASER PROCESSING DEVICE

TECHNICAL FIELD

One aspect of the present disclosure relates to a laser processing device.

BACKGROUND ART

Patent Literature 1 describes a laser processing method. This laser processing method includes a reflectance detection step of detecting a reflectance of a laser beam on an illuminated surface of a workpiece, an antireflection film formation step of forming an antireflection film on the illuminated surface of the workpiece based on the detected reflectance so that the illuminated surface has a reflectance of a predetermined value or less, and a laser processing step of, after the antireflection film formation step, emitting the laser beam to the illuminated surface of the workpiece to form a modified layer inside the workpiece.

CITATION LIST

Patent Literature

Patent Literature 1: Japanese Patent No. 5902529

SUMMARY OF INVENTION

Technical Problem

By the way, when a workpiece is irradiated with a laser beam for reflectance detection, the workpiece may be damaged. On the other hand, although a specific configuration for realizing the above laser processing method is unclear, the output of the laser beam for reflectance detection is smaller than the output when the modified layer is formed. As described above, in the above technical field, it is desired to acquire the reflectance while suppressing damage to an object to be processed.

One aspect of the present disclosure is to provide a laser processing device capable of acquiring reflectance while suppressing damage to an object to be processed.

Solution to Problem

A laser processing device according to one aspect of the present disclosure is a laser processing device for performing laser processing on an object to be processed by applying laser light of a first wavelength from a first surface side of the object to be processed to the object to be processed. The laser processing device includes a laser light source configured to output the laser light, a converging unit configured to converge the laser light toward the first surface to form a converging point, a camera configured to image reflected light of the laser light from the first surface, a spatial light modulator configured to modulate the laser light according to a modulation pattern, and a controller configured to execute acquisition processing of applying the laser light to the first surface by controlling the laser light source and imaging the reflected light by controlling the camera to acquire a reflectance of the first surface with respect to the first wavelength. In this laser processing device, before executing the acquisition processing, the controller executes modulation processing of causing the spatial light modulator to present the modulation pattern for lowering a power density of the laser light on the first surface.

In this laser processing device, acquisition processing is executed in which the controller applies the laser light to the first surface of the object to be processed by controlling the laser light source and images the reflected light of the laser light by controlling the camera, whereby the reflectance of the first surface to the laser light is acquired. At this time, the controller executes modulation processing for causing the spatial light modulator to present the modulation pattern for lowering the power density of the laser light on the first surface. As described above, in this laser processing device, the power density of the laser light is lowered by using the spatial light modulator in the acquisition of the reflectance. Thus, it is possible to acquire the reflectance while suppressing damage to the object to be processed.

In the laser processing device according to one aspect of the present disclosure, as the modulation processing, the controller may cause the spatial light modulator to present a shift pattern, which is a modulation pattern for shifting the converging point from the first surface. At this time, the laser processing device according to one aspect of the present disclosure further includes a support table for supporting the object to be processed, a moving mechanism for moving the support table, and a converging lens for converging reflected light toward the camera. In this laser processing device, the controller may move the support table by the moving mechanism so that the reflected light from the first surface is converged to the camera when the converging point is shifted from the first surface. In this case, it is possible to suppress the lowering of the power density of the reflected light on the camera while lowering the power density of the laser light on the first surface.

In the laser processing device according to one aspect of the present disclosure, as the modulation processing, the controller may cause the spatial light modulator to present a spot deformation pattern, which is a modulation pattern for changing a spot shape of the laser light on the first surface. In this case, it is possible to lower the power density of the laser light on the first surface while suppressing a difference between a state of the spot of the laser light on the first surface and a state of the spot of the reflected light on the camera.

In the laser processing device according to one aspect of the present disclosure, as the acquisition processing, the controller executes first processing of imaging the reflected light from the first surface by controlling the camera to acquire a first light amount as an amount of the reflected light from the first surface, second processing of applying the laser light from a side of a reference surface, of which reflectance for the first wavelength is known, to a reference object having the reference surface by controlling the laser light source and imaging reflected light from the reference surface by controlling the camera to acquire a reference light amount as an amount of the reflected light from the reference surface, and third processing of calculating a reflectance of the first surface for the first wavelength based on the reflectance of the reference surface for the first wavelength, the first light amount, and the reference light amount. As the modulation processing, the controller may cause the spatial light modulator to present the modulation pattern so that the spot shape of the laser light on the first surface in the first processing is different from the spot shape of the laser light on the reference surface in the second processing. As described above, when the spot shapes of the laser lights are different between the case (second processing) of acquiring the amount of the reflected light on the reference surface and the case (first processing) of acquiring the amount of the reflected light on the first surface of the object to be processed, a suitable spot shape according to the reflectance of each surface can be realized. As a result, a dynamic range of measurable reflectance can be expanded.

Advantageous Effects of Invention

According to one aspect of the present disclosure, it is possible to provide a laser processing device capable of acquiring reflectance while suppressing damage to an object to be processed.

BRIEF DESCRIPTION OF DRAWINGS

FIG. 17 is a diagram illustrating spots of laser light and reflected light.

FIG. 19 is a diagram illustrating a modulation pattern and the spots of the laser light and the reflected light.

FIG. 21 is a diagram illustrating the spots of the laser light and the reflected light.

FIG. 22 is a diagram illustrating the modulation pattern and the spot of the laser light.

FIG. 23 is a diagram illustrating the spot of the laser light.

FIG. 24 is a graph for explaining an effect.

FIG. 25 is a schematic cross-sectional view showing a state of processing in each mode.

DESCRIPTION OF EMBODIMENTS

Figure 1:
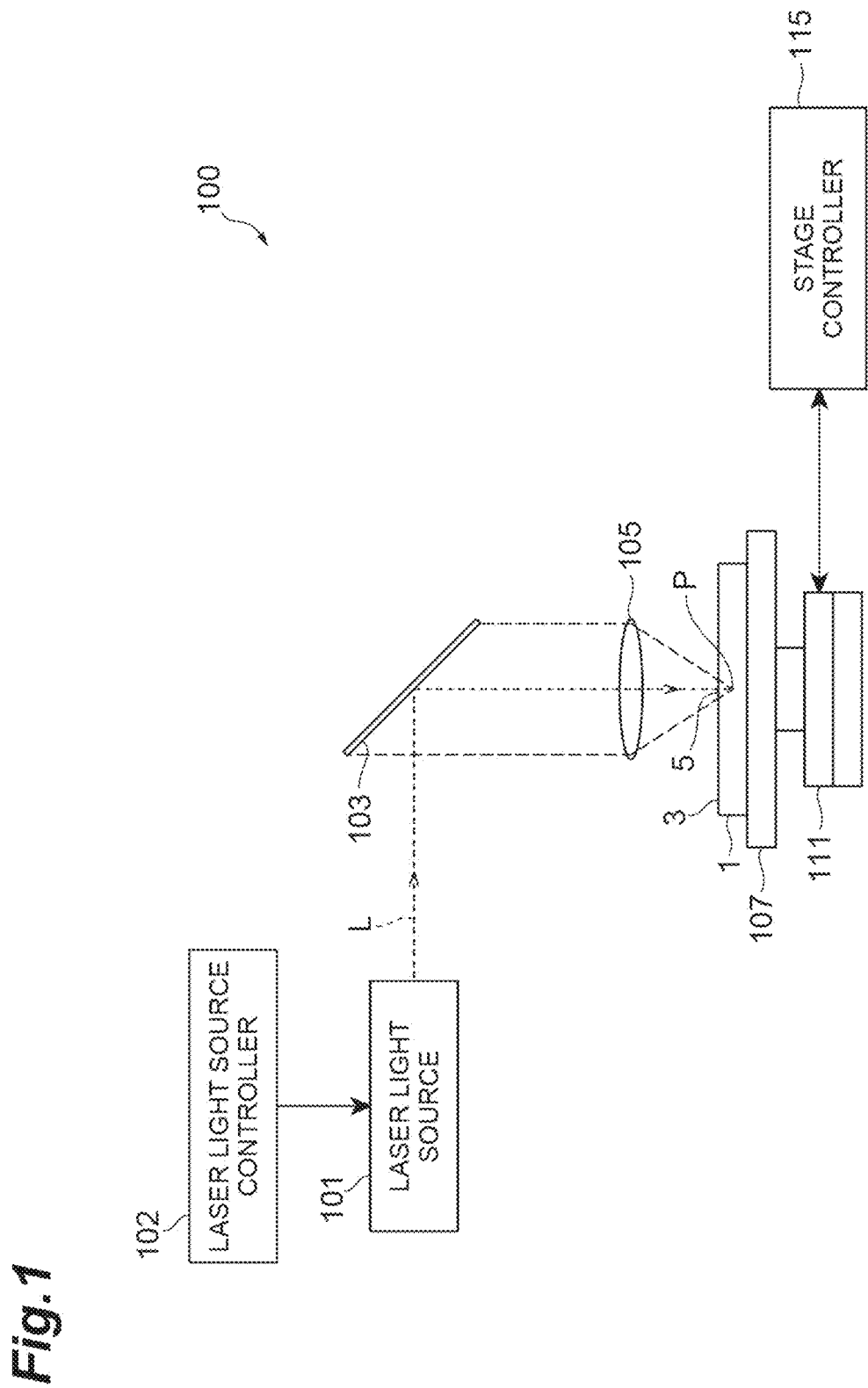
FIG. 1 is a schematic configuration diagram of a laser processing device used for forming a modified region.

Hereinafter, an embodiment of a laser processing method and a laser processing device will be described with reference to the drawings. In the description of the drawings, the same elements or corresponding elements are denoted by the same reference numerals, and overlapping explanations may be omitted.

In a laser processing device according to the embodiment, laser light is converged at an object to be processed to form a modified region within the object to be processed along a line to cut. Therefore, formation of the modified region will be described at first with reference to FIGS. 1 to 6.

As illustrated in FIG. 1, a laser processing device 100 includes a laser light source 101 configured to cause laser light L to oscillate in a pulsating manner, a dichroic mirror 103 arranged so as to change a direction of the optical axis (optical path) of the laser light L by 90°, and a converging lens 105 configured to converge the laser light L. The laser processing device 100 further includes a support table 107 configured to support an object to be processed 1 that is an object to which the laser light L converged by the converging lens 105 is emitted, a stage 111 that is a moving mechanism configured to move the support table 107, a laser light source controller 102 configured to control the laser light source 101 in order to adjust the output, pulse width, pulse waveform, and the like of the laser light L, and a stage controller 115 configured to control the movement of the stage 111.

In the laser processing device 100, the laser light L emitted from the laser light source 101 changes the direction of its optical axis by 90° with the dichroic minor 103 and then is converged by the converging lens 105 within the object to be processed 1 mounted on the support table 107. At the same time, the stage 111 is moved, so that the object to be processed 1 moves with respect to the laser light L along a line to cut 5. Thus, a modified region along the line to cut 5 is formed in the object to be processed 1. While the stage 111 is moved here for relatively moving the laser light L, the converging lens 105 may be moved instead or together therewith.

Figure 2:
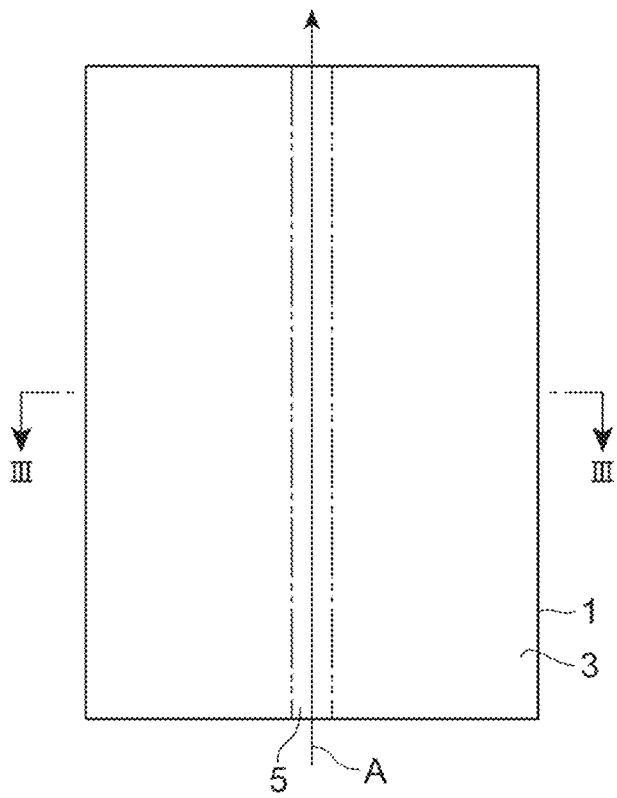
FIG. 2 is a plan view of an object to be processed for which the modified region is formed.
Figure 3:
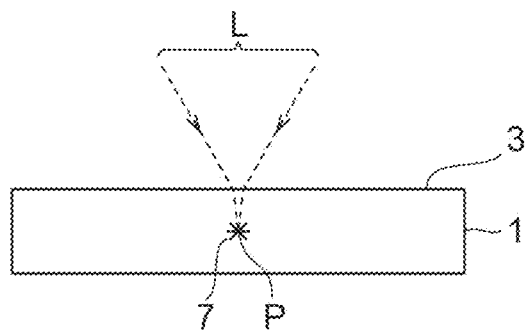
FIG. 3 is a sectional view of the object to be processed taken along the line III-III of FIG. 2.
Figure 4:
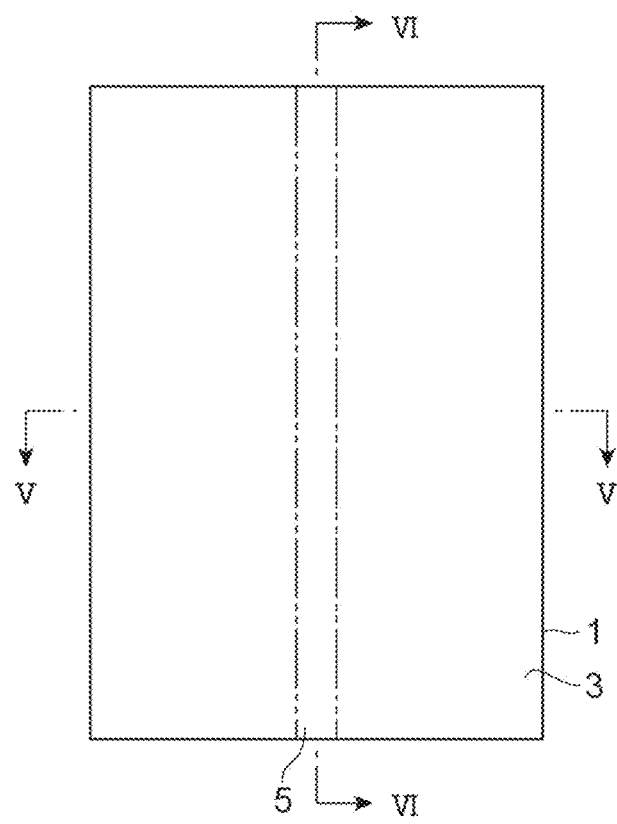
FIG. 4 is a plan view of the object to be processed after laser processing.
Figure 5:
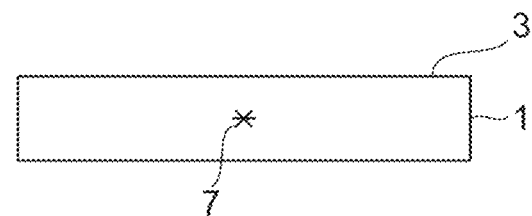
FIG. 5 is a sectional view of the object to be processed taken along the line V-V of FIG. 4.
Figure 6:
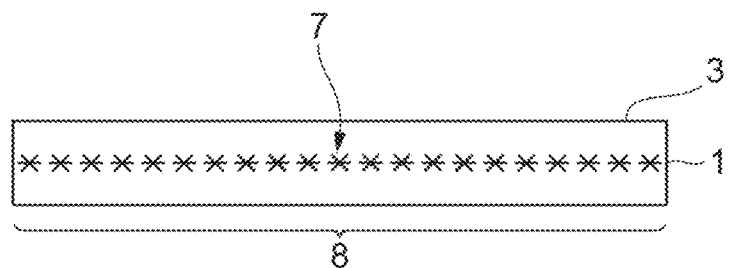
FIG. 6 is a sectional view of the object to be processed taken along the line VI-VI of FIG. 4.

Employed as the object to be processed 1 is a planar member (for example, a substrate or a wafer), examples of which include semiconductor substrates formed of semiconductor materials and piezoelectric substrates formed of piezoelectric materials. As illustrated in FIG. 2, in the object to be processed 1, the line to cut 5 is set for cutting the object to be processed 1. The line to cut 5 is a virtual line extending straight. In a case where a modified region is formed within the object to be processed 1, the laser light L is relatively moved along the line to cut 5 (that is, in the direction of arrow A in FIG. 2) while a converging point (converging position) P is set within the object to be processed 1 as illustrated in FIG. 3. Thus, a modified region 7 is formed within the object to be processed 1 along the line to cut 5 as illustrated in FIGS. 4, 5 and 6, and the modified region 7 formed along the line to cut 5 becomes a cutting start region 8. The line to cut 5 corresponds to an irradiation schedule line.

The converging point P is a position at which the laser light L is converged. The line to cut 5 may be curved instead of being straight, a three-dimensional one combining them, or one specified by coordinates. The line to cut 5 may be one actually drawn on a front surface 3 of the object to be processed 1 without being restricted to the virtual line. The modified region 7 may be formed either continuously or intermittently. The modified region 7 may be formed in either rows or dots, and only needs to be formed at least within the object to be processed 1, on the front surface 3, or on a back surface. A crack may be formed from the modified region 7 as a start point, and the crack and the modified region 7 may be exposed at an outer surface (the front surface 3, the back surface, or an outer peripheral surface) of the object to be processed 1. A laser light entrance surface in forming the modified region 7 is not limited to the front surface 3 of the object to be processed 1 but may be the back surface of the object to be processed 1.

Incidentally, in a case where the modified region 7 is formed within the object to be processed 1, the laser light L is transmitted through the object to be processed 1 and is particularly absorbed near the converging point P located within the object to be processed 1. Thus, the modified region 7 is formed in the object to be processed 1 (that is, internal absorption type laser processing). In this case, the front surface 3 of the object to be processed 1 hardly absorbs the laser light L and thus does not melt. On the other hand, in a case where the modified region 7 is formed on the front surface 3 or the back surface of the object to be processed 1, the laser light L is particularly absorbed near the converging point P located on the front surface 3 or the back surface, and removal portions such as holes and grooves are formed (surface absorption type laser processing) by being melted from the front surface 3 or the back surface and removed.

The modified region 7 is a region in which density, refractive index, mechanical strength and other physical characteristics are different from the surroundings. Examples of the modified region 7 include a molten processed region (meaning at least one of a region re-solidified after having been once molten, a region in the molten state, and a region in the process of re-solidifying from the molten state), a crack region, a dielectric breakdown region, a refractive index changed region, and a mixed region thereof. Other examples of the modified region 7 include a region where the density of the modified region 7 has changed compared to the density of an unmodified region in a material of the object to be processed 1, and a region formed with a lattice defect. In a case where the material of the object to be processed 1 is single crystal silicon, the modified region 7 can also be said to be a high dislocation density region.

The molten processed region, refractive index changed region, region where the density of the modified region 7 has changed compared to the density of the unmodified region, and region formed with the lattice defect may further incorporate the crack (cracking or microcrack) therewithin or at an interface between the modified region 7 and the unmodified region. The incorporated crack may be formed over the whole surface of the modified region 7 or in only a portion or a plurality of portions thereof. The object to be processed 1 includes a substrate made of a crystalline material having a crystal structure. For example, the object to be processed 1 includes a substrate formed of at least one of gallium nitride (GaN), silicon (Si), silicon carbide (SiC), $LiTaO_3$, and sapphire ($Al_2O_3$). In other words, the object to be processed 1 includes, for example, a gallium nitride substrate, a silicon substrate, a SiC substrate, a $LiTaO_3$ substrate, or a sapphire substrate. The crystalline material may be either an anisotropic crystal or an isotropic crystal. In addition, the object to be processed 1 may include a substrate made of a non-crystalline material having a non-crystalline structure (amorphous structure), and may include a glass substrate, for example.

In the embodiment, the modified region 7 can be formed by forming a plurality of modified spots (processing marks) along the line to cut 5. In this case, the plurality of modified spots gathers to be the modified region 7. Each of the modified spots is a modified portion formed by a shot of one pulse of pulsed laser light (that is, laser irradiation of one pulse: laser shot). Examples of the modified spots include crack spots, molten processed spots, refractive index changed spots, and those in which at least one of them is mixed. As for the modified spots, their sizes and lengths of the crack occurring therefrom can be controlled as necessary in view of the required cutting accuracy, the required flatness of cut surfaces, the thickness, kind, and crystal orientation of the object to be processed 1, and the like. In addition, in the embodiments, the modified spots can be formed as the modified region 7, along the line to cut 5.

Laser Processing Device According to Embodiments

Next, the laser processing device according to the embodiments will be described. In the following description, the directions orthogonal to each other in the horizontal plane are defined as the X-axis direction and the Y-axis direction, and the vertical direction is defined as the Z-axis direction.

[Overall Configuration of Laser Processing Device]

Figure 7:
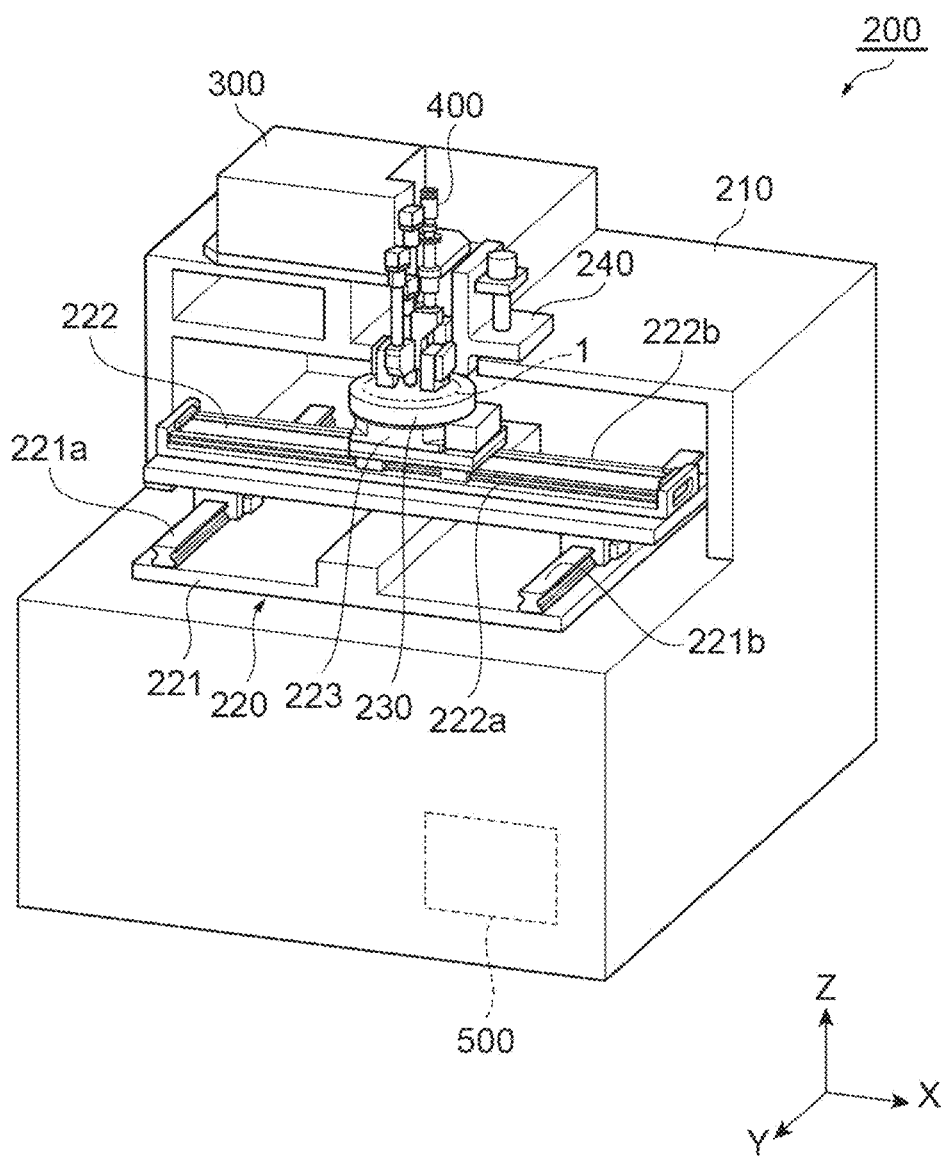
FIG. 7 is a perspective view of a laser processing device according to an embodiment.

As illustrated in FIG. 7, a laser processing device 200 includes a device frame 210, a first moving mechanism (moving mechanism) 220, a support table 230, and a second moving mechanism (moving mechanism) 240. Further, the laser processing device 200 includes a laser output unit 300, a laser converging unit 400, and a controller 500.

The first moving mechanism 220 is attached to the device frame 210. The first moving mechanism 220 includes a first rail unit 221, a second rail unit 222, and a movable base 223. The first rail unit 221 is attached to the device frame 210. The first rail unit 221 is provided with a pair of rails 221a and 221b extending along the Y-axis direction. The second rail unit 222 is attached to the pair of rails 221a and 221b of the first rail unit 221 so as to be movable along the Y-axis direction. The second rail unit 222 is provided with a pair of rails 222a and 222b extending along the X-axis direction. The movable base 223 is attached to the pair of rails 222a and 222b of the second rail unit 222 so as to be movable along the X-axis direction. The movable base 223 is rotatable about an axis parallel to the Z-axis direction as the center.

Figure 8:
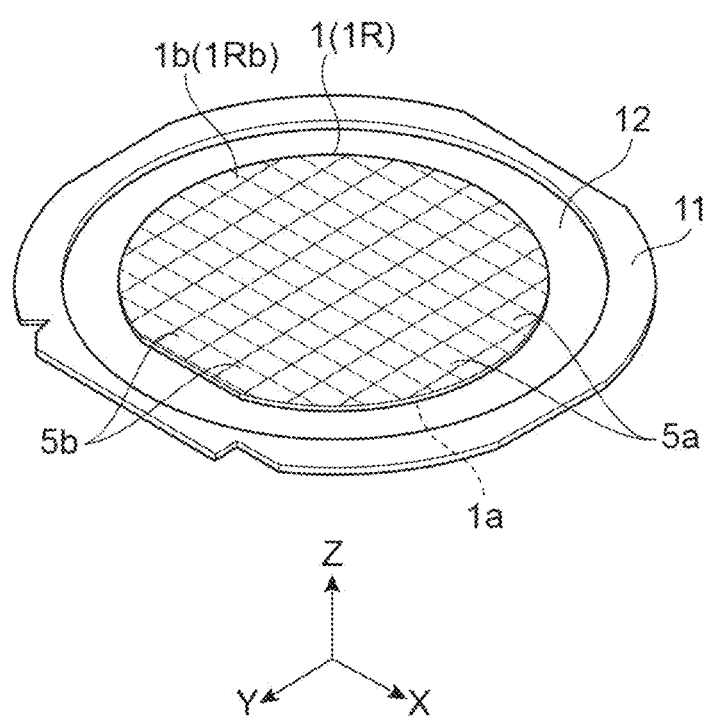
FIG. 8 is a perspective view of an object to be processed attached to a support table of the laser processing device of FIG. 7.

The support table 230 is attached to the movable base 223. The support table 230 supports the object to be processed 1. The object to be processed 1 includes a plurality of functional devices (a light receiving device such as a photodiode, a light emitting device such as a laser diode, a circuit device formed as a circuit, or the like) formed in a matrix shape on the front surface side of a substrate made of a semiconductor material such as silicon. When the object to be processed 1 is supported on the support table 230, as illustrated in FIG. 8, on a film 12 stretched over an annular frame 11, for example, a front surface 1a of the object to be processed 1 (a surface of the plurality of functional devices side) is pasted. The support table 230 holds the frame 11 with a clamp and suctions the film 12 with a vacuum chuck table, to support the object to be processed 1. On the support table 230, a plurality of lines to cut 5a parallel to each other and a plurality of lines to cut 5b parallel to each other are set in a grid pattern so as to pass between adjacent functional devices on the object to be processed 1.

As illustrated in FIG. 7, the support table 230 is moved along the Y-axis direction by operation of the second rail unit 222 in the first moving mechanism 220. In addition, the support table 230 is moved along the X-axis direction by operation of the movable base 223 in the first moving mechanism 220. Further, the support table 230 is rotated about the axis parallel to the Z-axis direction as the center by operation of the movable base 223 in the first moving mechanism 220. As described above, the support table 230 is attached to the device frame 210 to be movable along the X-axis direction and the Y-axis direction, and to be rotatable about the axis parallel to the Z-axis direction as the center.

The laser output unit 300 is attached to the device frame 210. The laser converging unit 400 is attached to the device frame 210 via the second moving mechanism 240. The laser converging unit 400 is moved along the Z-axis direction by operation of the second moving mechanism 240. As described above, the laser converging unit 400 is attached to the device frame 210 so as to be movable along the Z-axis direction with respect to the laser output unit 300.

The controller 500 includes a Central Processing Unit (CPU), Read Only Memory (ROM), Random Access Memory (RAM), and the like. The controller 500 controls operation of each unit of the laser processing device 200.

As an example, in the laser processing device 200, a modified region is formed within the object to be processed 1 along each of the lines to cut 5a and 5b (see FIG. 8) as follows.

First, the object to be processed 1 is supported on the support table 230 such that a back surface 1b (see FIG. 8) of the object to be processed 1 becomes the laser light entrance surface, and each of the lines to cut 5a of the object to be processed 1 is aligned in a direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each line to cut 5a. Thus, the modified region is formed within the object to be processed 1 along each of the lines to cut 5a.

When the formation of the modified region along each of the lines to cut 5a is completed, the support table 230 is rotated by the first moving mechanism 220, and each of the lines to cut 5b of the object to be processed 1 is aligned in the direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each line to cut 5b. Thus, the modified region is formed within the object to be processed 1 along each line to cut 5b.

As described above, in the laser processing device 200, the direction parallel to the X-axis direction is a processing direction (scanning direction of the laser light L). Note that, the relative movement of the converging point of the laser light L along each line to cut 5a and the relative movement of the converging point of the laser light L along each line to cut 5b are performed by the movement of the support table 230 along the X-axis direction by the first moving mechanism 220. In addition, the relative movement of the converging point of the laser light L between the lines to cut 5a and the relative movement of the converging point of the laser light L between the lines to cut 5b are performed by the movement of the support table 230 along the Y-axis direction by the first moving mechanism 220.

Figure 9:
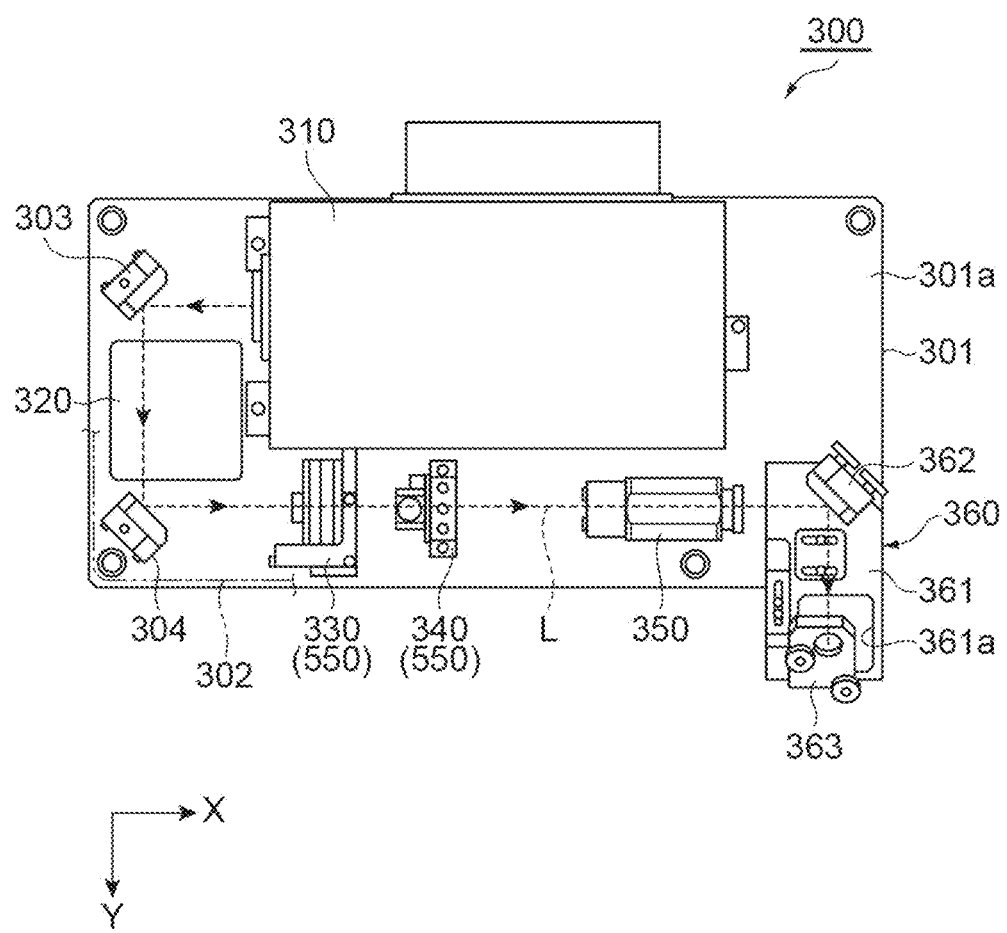
FIG. 9 is a sectional view of a laser output unit taken along the ZX plane of FIG. 7.

As illustrated in FIG. 9, the laser output unit 300 includes a mounting base 301, a cover 302, and a plurality of mirrors 303 and 304. Further, the laser output unit 300 includes a laser oscillator (laser light source) 310, a shutter 320, a λ/2 wave plate unit 330, a polarizing plate unit 340, a beam expander 350, and a mirror unit 360.

The mounting base 301 supports the plurality of mirrors 303 and 304, the laser oscillator 310, the shutter 320, the λ/2 wave plate unit 330, the polarizing plate unit 340, the beam expander 350, and the mirror unit 360. The plurality of mirrors 303 and 304, the laser oscillator 310, the shutter 320, the λ/2 wave plate unit 330, the polarizing plate unit 340, the beam expander 350, and the mirror unit 360 are attached to a main surface 301a of the mounting base 301. The mounting base 301 is a planar member and is detachable with respect to the device frame 210 (see FIG. 7). The laser output unit 300 is attached to the device frame 210 via the mounting base 301. That is, the laser output unit 300 is detachable with respect to the device frame 210.

The cover 302 covers the plurality of mirrors 303 and 304, the laser oscillator 310, the shutter 320, the λ/2 wave plate unit 330, the polarizing plate unit 340, the beam expander 350, and the minor unit 360 on the main surface 301a of the mounting base 301. The cover 302 is detachable with respect to the mounting base 301.

The laser oscillator 310 oscillates linearly polarized laser light L in a pulsating manner along the X-axis direction. The wavelength of the laser light L emitted from the laser oscillator 310 is included in any of the wavelength bands of from 500 nm to 550 nm, from 1000 nm to 1150 nm, or from 1300 nm to 1400 nm. The laser light L in the wavelength band of from 500 nm to 550 nm is suitable for internal absorption type laser processing on a substrate made of sapphire, for example. The laser light L in each of the wavelength bands of from 1000 nm to 1150 nm and from 1300 nm to 1400 nm is suitable for internal absorption type laser processing for a substrate made of silicon, for example. The polarization direction of the laser light L emitted from the laser oscillator 310 is, for example, a direction parallel to the Y-axis direction. The laser light L emitted from the laser oscillator 310 is reflected by the minor 303 and enters the shutter 320 along the Y-axis direction.

In the laser oscillator 310, ON/OFF of the output of the laser light L is switched as follows. In a case where the laser oscillator 310 includes a solid state laser, ON/OFF of a Q switch (acousto-optic modulator (AOM), electro-optic modulator (EOM), or the like) provided in a resonator is switched, whereby ON/OFF of the output of the laser light L is switched at high speed. In a case where the laser oscillator 310 includes a fiber laser, ON/OFF of the output of a semiconductor laser constituting a seed laser and an amplifier (excitation) laser is switched, whereby ON/OFF of the output of the laser light L is switched at high speed. In a case where the laser oscillator 310 uses an external modulation device, ON/OFF of the external modulation device (AOM, EOM, or the like) provided outside the resonator is switched, whereby ON/OFF of the output of the laser light L is switched at high speed.

The shutter 320 opens and closes the optical path of the laser light L by a mechanical mechanism. Switching ON/OFF of the output of the laser light L from the laser output unit 300 is performed by switching ON/OFF of the output of the laser light L in the laser oscillator 310 as described above, and the shutter 320 is provided, whereby the laser light L is prevented from being unexpectedly emitted from the laser output unit 300, for example. The laser light L having passed through the shutter 320 is reflected by the mirror 304 and sequentially enters the λ/2 wave plate unit 330 and the polarizing plate unit 340 along the X-axis direction.

The λ/2 wave plate unit 330 and the polarizing plate unit 340 function as an attenuator 550 configured to adjust the output (light intensity) of the laser light L. In addition, the λ/2 wave plate unit 330 and the polarizing plate unit 340 each function as the polarization direction adjusting unit configured to adjust the polarization direction of the laser light L. The laser light L having sequentially passed through the λ/2 wave plate unit 330 and the polarizing plate unit 340 enters the beam expander 350 along the X-axis direction.

The beam expander 350 collimates the laser light L while adjusting the diameter of the laser light L. The laser light L having passed through the beam expander 350 enters the mirror unit 360 along the X-axis direction.

The mirror unit 360 includes a support base 361 and a plurality of mirrors 362 and 363. The support base 361 supports the plurality of mirrors 362 and 363. The support base 361 is attached to the mounting base 301 so as to be position adjustable along the X-axis direction and the Y-axis direction. The mirror (first mirror) 362 reflects the laser light L having passed through the beam expander 350 in the Y-axis direction. The mirror 362 is attached to the support base 361 such that its reflective surface is angle adjustable around an axis parallel to the Z-axis, for example.

The mirror (second minor) 363 reflects the laser light L reflected by the mirror 362 in the Z-axis direction. The minor 363 is attached to the support base 361 such that its reflective surface is angle adjustable around an axis parallel to the X-axis, for example, and is position adjustable along the Y-axis direction. The laser light L reflected by the minor 363 passes through an opening 361a formed in the support base 361 and enters the laser converging unit 400 (see FIG. 7) along the Z-axis direction. That is, an emission direction of the laser light L by the laser output unit 300 coincides with a moving direction of the laser converging unit 400. As described above, each of the mirrors 362 and 363 includes a mechanism configured to adjust the angle of the reflective surface.

In the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed, whereby the position and angle of the optical axis of the laser light L emitted from the laser output unit 300 are aligned with respect to the laser converging unit 400. That is, each of the plurality of mirrors 362 and 363 is a component configured to adjust the optical axis of the laser light L emitted from the laser output unit 300.

Figure 10:
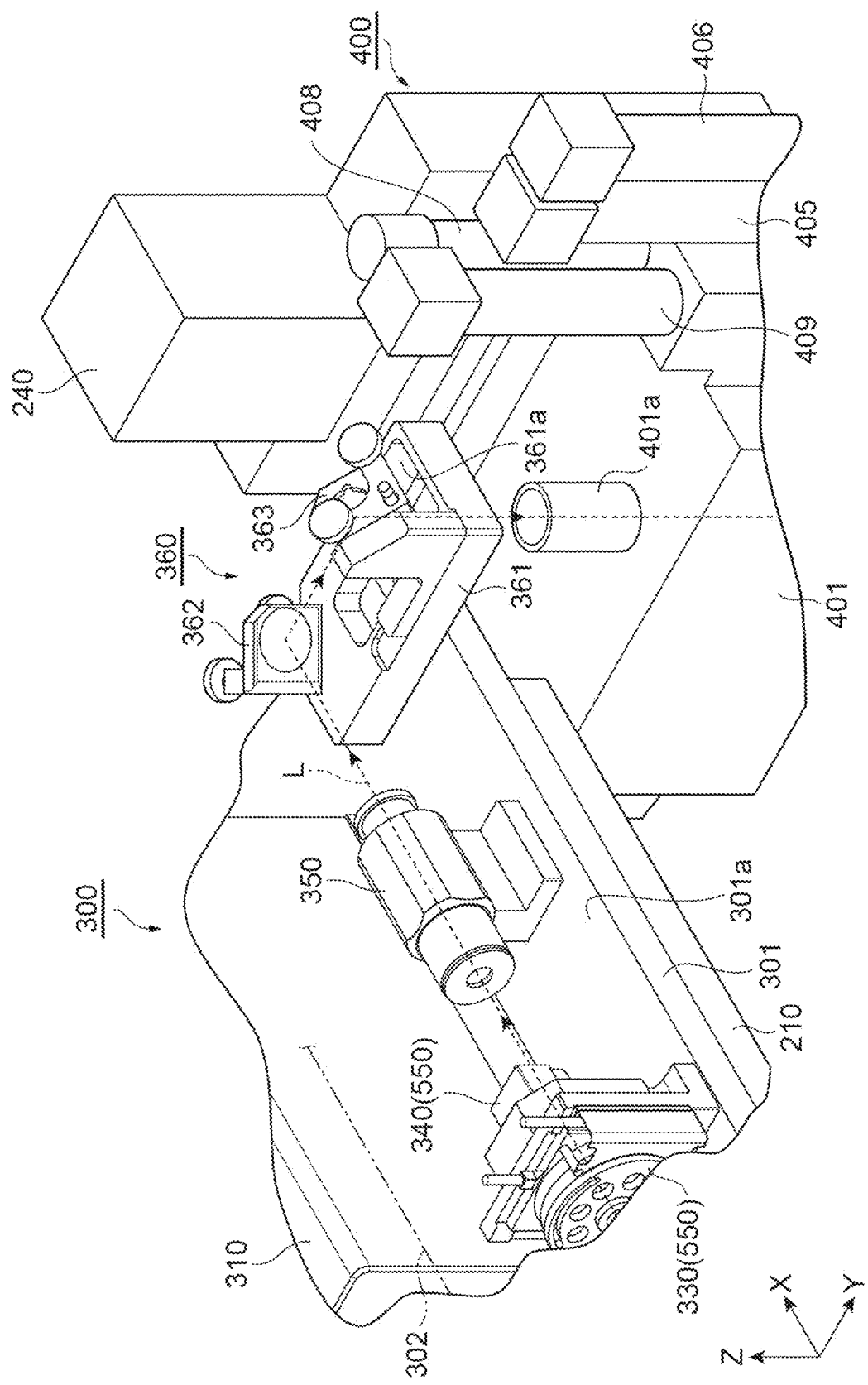
FIG. 10 is a perspective view of a part of the laser output unit and a laser converging unit in the laser processing device of FIG. 7.

As illustrated in FIG. 10, the laser converging unit 400 includes a housing 401. The housing 401 has a rectangular parallelepiped shape with the Y-axis direction as the longitudinal direction. The second moving mechanism 240 is attached to one side surface 401e of the housing 401 (see FIGS. 11 and 13). A cylindrical light entrance unit 401a is provided in the housing 401 so as to face the opening 361a of the mirror unit 360 in the Z-axis direction. The light entrance unit 401a allows the laser light L emitted from the laser output unit 300 to enter the housing 401. The mirror unit 360 and the light entrance unit 401a are separated from each other by a distance in which mutual contact does not occur when the laser converging unit 400 is moved along the Z-axis direction by the second moving mechanism 240.

Figure 11:
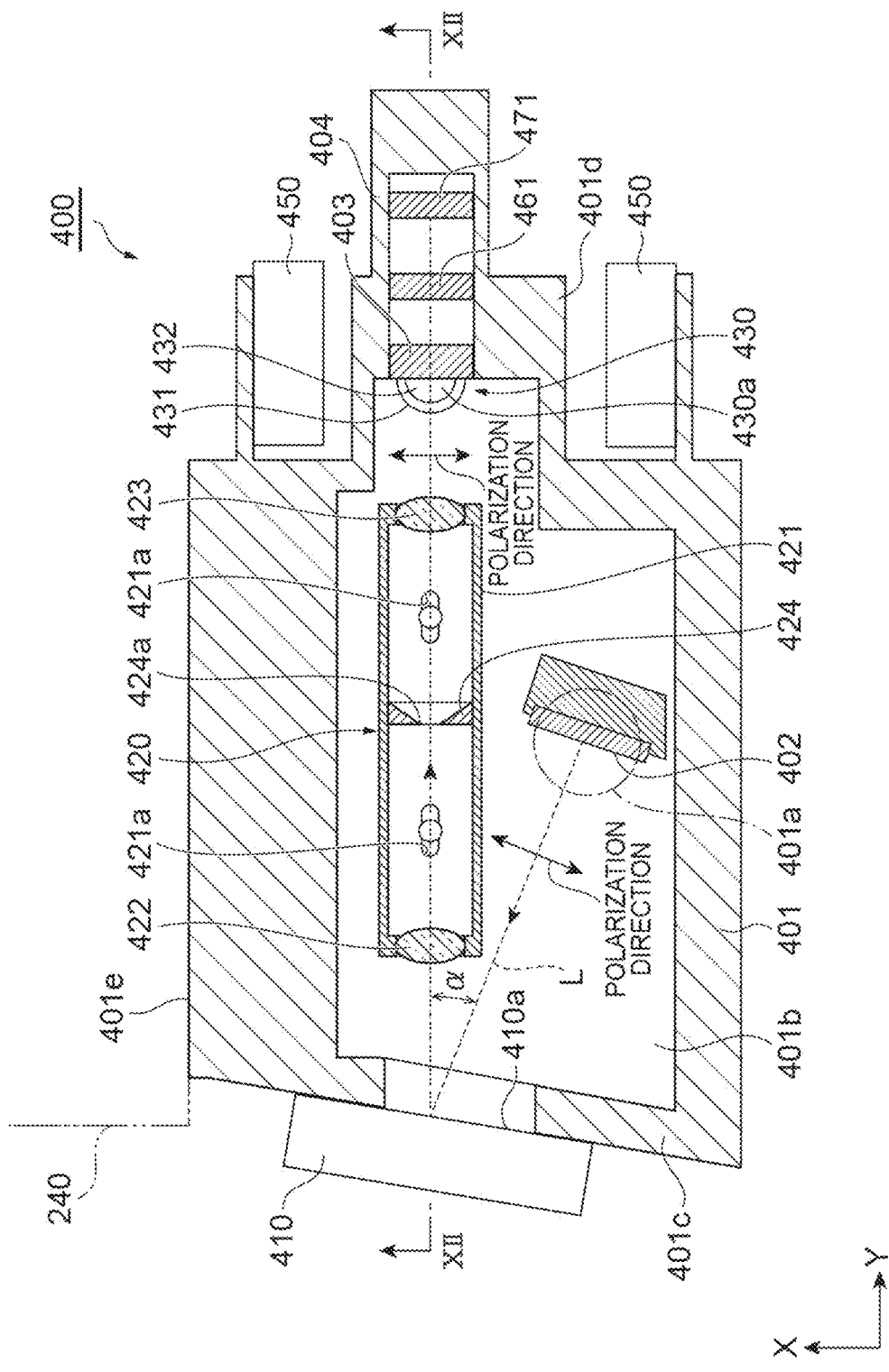
FIG. 11 is a sectional view of the laser converging unit taken along the XY plane of FIG. 7.
Figure 12:
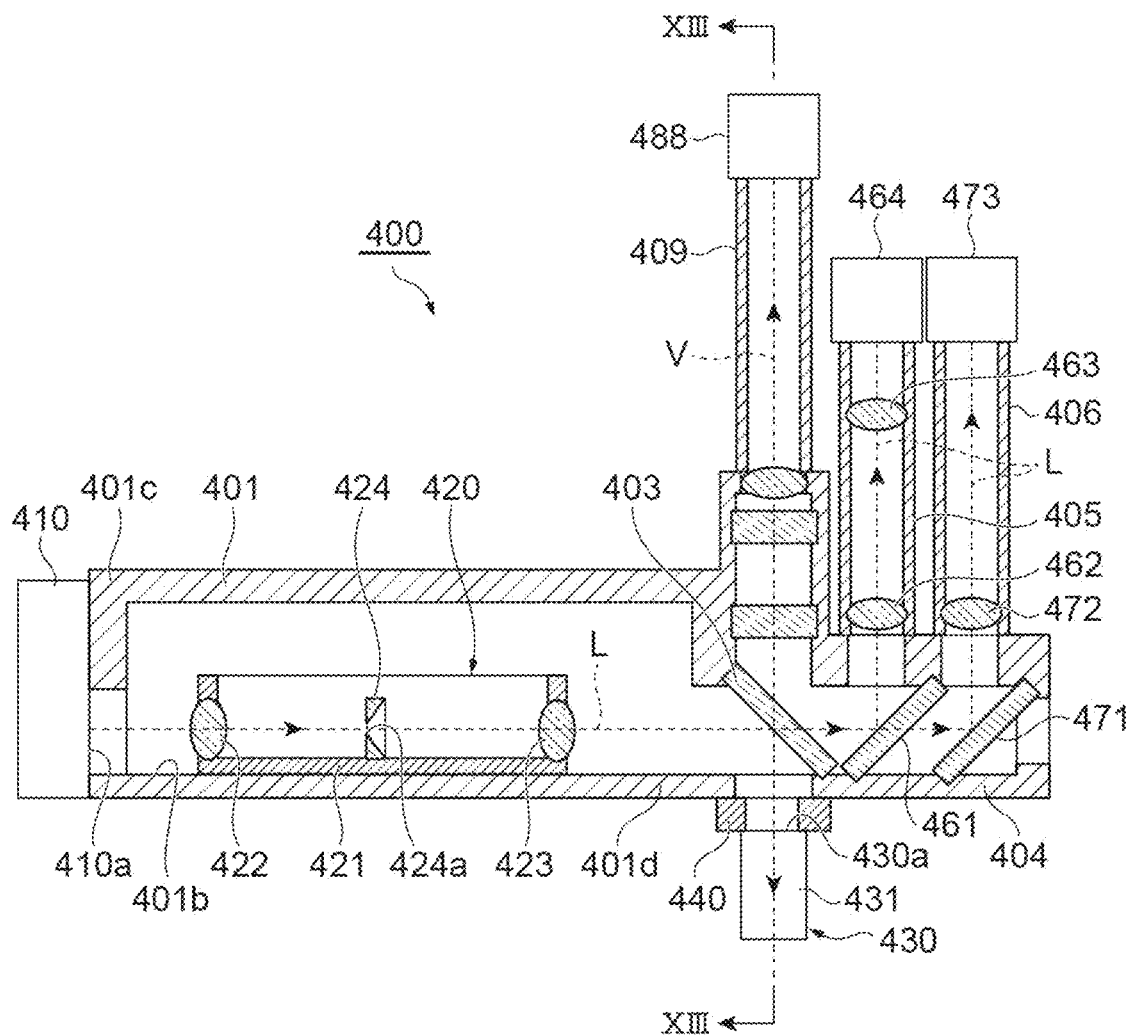
FIG. 12 is a sectional view of the laser converging unit taken along the line XII-XII of FIG. 11.

As illustrated in FIGS. 11 and 12, the laser converging unit 400 includes a mirror 402 and a dichroic mirror 403. Further, the laser converging unit 400 includes a reflective spatial light modulator 410, a 4f lens unit 420, a converging lens unit (converging unit, objective lens) 430, a drive mechanism 440, and a pair of distance measuring sensors 450.

The minor 402 is attached to a bottom surface 401b of the housing 401 so as to face the light entrance unit 401a in the Z-axis direction. The minor 402 reflects the laser light L entering the housing 401 via the light entrance unit 401a in a direction parallel to the XY plane. The laser light L collimated by the beam expander 350 of the laser output unit 300 enters the minor 402 along the Z-axis direction. That is, the laser light L as parallel light enters the mirror 402 along the Z-axis direction. For that reason, even if the laser converging unit 400 is moved along the Z-axis direction by the second moving mechanism 240, a constant state is maintained of the laser light L entering the mirror 402 along the Z-axis direction. The laser light L reflected by the minor 402 enters the reflective spatial light modulator 410.

The reflective spatial light modulator 410 is attached to an end 401c of the housing 401 in the Y-axis direction in a state where the reflective surface 410a faces the inside of the housing 401. The reflective spatial light modulator 410 is, for example, a reflective liquid crystal (Liquid Crystal on Silicon (LCOS)) Spatial Light Modulator (SLM), and reflects the laser light L in the Y-axis direction while modulating the laser light L. The laser light L modulated and reflected by the reflective spatial light modulator 410 enters the 4f lens unit 420 along the Y-axis direction. Here, in a plane parallel to the XY plane, an angle α formed by an optical axis of the laser light L entering the reflective spatial light modulator 410 and an optical axis of the laser light L emitted from the reflective spatial light modulator 410, is an acute angle (for example, from 10° to 60°). That is, the laser light L is reflected at an acute angle along the XY plane in the reflective spatial light modulator 410. This is for suppressing an incident angle and a reflection angle of the laser light L to inhibit the degradation of diffraction efficiency, and for sufficiently exerting performance of the reflective spatial light modulator 410. Note that, in the reflective spatial light modulator 410, for example, the thickness of a light modulation layer in which a liquid crystal is used is extremely thin as several micrometers to several tens of micrometers, so that the reflective surface 410a can be regarded as substantially the same as a light entering and exiting surface of the light modulation layer.

The 4f lens unit 420 includes a holder 421, a lens 422 on the reflective spatial light modulator 410 side, a lens 423 on the converging lens unit 430 side, and a slit member 424.

The holder 421 holds a pair of the lenses 422 and 423 and the slit member 424. The holder 421 maintains a constant mutual positional relationship between the pair of lenses 422 and 423 and the slit member 424 in a direction along the optical axis of the laser light L. The pair of lenses 422 and 423 constitutes a double telecentric optical system in which the reflective surface 410a of the reflective spatial light modulator 410 and an entrance pupil plane (pupil plane) 430a of the converging lens unit 430 are in an imaging relationship.

Thus, an image of the laser light L on the reflective surface 410a of the reflective spatial light modulator 410 (an image of the laser light L modulated in the reflective spatial light modulator 410) is transferred to (imaged on) the entrance pupil plane 430a of the converging lens unit 430. A slit 424a is formed in the slit member 424. The slit 424a is located between the lens 422 and the lens 423 and near a focal plane of the lens 422. Unnecessary part of the laser light L modulated and reflected by the reflective spatial light modulator 410 is blocked by the slit member 424. The laser light L having passed through the 4f lens unit 420 enters the dichroic mirror 403 along the Y-axis direction.

The dichroic mirror 403 reflects most (for example, from 95% to 99.5%) of the laser light L in the Z-axis direction and transmits part (for example, from 0.5% to 5%) of the laser light L along the Y-axis direction. Most of the laser light L is reflected at a right angle along the ZX plane in the dichroic mirror 403. The laser light L reflected by the dichroic mirror 403 enters the converging lens unit 430 along the Z-axis direction.

The converging lens unit 430 is attached to an end 401d (an end on the opposite side from the end 401c) of the housing 401 in the Y-axis direction via the drive mechanism 440. The converging lens unit 430 includes a holder 431 and a plurality of lenses 432. The holder 431 holds the plurality of lenses 432. The plurality of lenses 432 converges the laser light L at the object to be processed 1 (see FIG. 7) supported by the support table 230. The drive mechanism 440 moves the converging lens unit 430 along the Z-axis direction by driving force of a piezoelectric device.

The pair of distance measuring sensors 450 is attached to the end 401d of the housing 401 so as to be respectively located on both sides of the converging lens unit 430 in the X-axis direction. Each of the distance measuring sensors 450 emits light for distance measurement (for example, laser light) to the laser light entrance surface of the object to be processed 1 (see FIG. 7) supported by the support table 230, and detects the light for distance measurement reflected by the laser light entrance surface, thereby acquiring displacement data of the laser light entrance surface of the object to be processed 1. Note that, for the distance measuring sensors 450, sensors can be used of a triangulation method, a laser confocal method, a white confocal method, a spectral interference method, an astigmatism method, and the like.

In the laser processing device 200, as described above, the direction parallel to the X-axis direction is the processing direction (scanning direction of the laser light L). For that reason, when the converging point of the laser light L is relatively moved along each of the lines to cut 5a and 5b, out of the pair of distance measuring sensors 450, one of the distance measuring sensors 450 being relatively advanced with respect to the converging lens unit 430 acquires the displacement data of the laser light entrance surface of the object to be processed 1 along each of the lines to cut 5a and 5b. Then, the drive mechanism 440 moves the converging lens unit 430 along the Z-axis direction on the basis of the displacement data acquired by the distance measuring sensors 450 such that a constant distance is maintained between the laser light entrance surface of the object to be processed 1 and the converging point of the laser light L.

The laser converging unit 400 includes a beam splitter 461, a pair of lenses 462 and 463, and a profile acquisition camera (intensity distribution acquisition unit) 464. The beam splitter 461 divides the laser light L transmitted through the dichroic mirror 403 into a reflection component and a transmission component. The laser light L reflected by the beam splitter 461 sequentially enters the pair of lenses 462 and 463, and the profile acquisition camera 464 along the Z-axis direction. The pair of lenses 462 and 463 constitutes a double telecentric optical system in which the entrance pupil plane 430a of the converging lens unit 430 and an imaging surface of the profile acquisition camera 464 are in an imaging relationship. Thus, an image of the laser light L on the entrance pupil plane 430a of the converging lens unit 430 is transferred to (imaged on) the imaging surface of the profile acquisition camera 464. As described above, the image of the laser light L on the entrance pupil plane 430a of the converging lens unit 430 is the image of the laser light L modulated in the reflective spatial light modulator 410. Therefore, in the laser processing device 200, an imaging result by the profile acquisition camera 464 is monitored, whereby an operation state of the reflective spatial light modulator 410 can be grasped.

Further, the laser converging unit 400 includes a beam splitter 471, a lens 472, and a camera 473 for monitoring an optical axis position of the laser light L. The beam splitter 471 divides the laser light L transmitted through the beam splitter 461 into a reflection component and a transmission component. The laser light L reflected by the beam splitter 471 sequentially enters the lens 472 and the camera 473 along the Z-axis direction. The lens 472 converges the entering laser light L on an imaging surface of the camera 473. In the laser processing device 200, while an imaging result by each of the cameras 464 and 473 is monitored, in the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed (see FIGS. 9 and 10), whereby a shift can be corrected of the optical axis of the laser light L entering the converging lens unit 430 (a positional shift of intensity distribution of the laser light with respect to the converging lens unit 430, and an angular shift of the optical axis of the laser light L with respect to the converging lens unit 430).

The plurality of beam splitters 461 and 471 is arranged in a cylindrical body 404 extending along the Y-axis direction from the end 401d of the housing 401. The pair of lenses 462 and 463 is arranged in a cylindrical body 405 erected on the cylindrical body 404 along the Z-axis direction, and the profile acquisition camera 464 is arranged at an end of the cylindrical body 405. The lens 472 is arranged in a cylindrical body 406 erected on the cylindrical body 404 along the Z-axis direction, and the camera 473 is arranged at an end of the cylindrical body 406. The cylindrical body 405 and the cylindrical body 406 are arranged side by side in the Y-axis direction. Note that, the laser light L transmitted through the beam splitter 471 may be absorbed by a damper or the like provided at an end of the cylindrical body 404, or may be used for an appropriate purpose.

Figure 13:
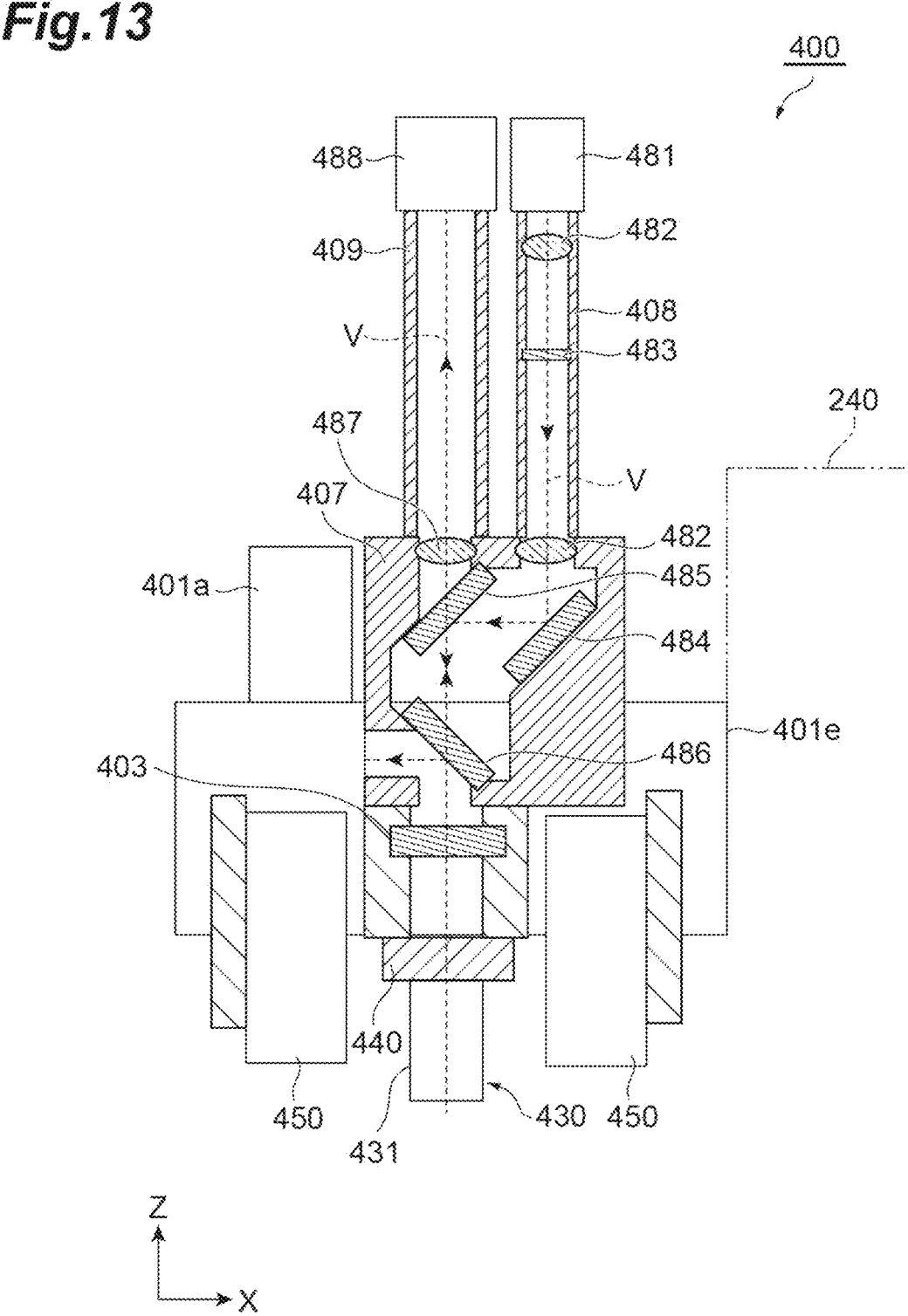
FIG. 13 is a sectional view of the laser converging unit taken along the line XIII-XIII of FIG. 12.

As illustrated in FIGS. 12 and 13, the laser converging unit 400 includes a visible light source 481, a plurality of lenses 482, a reticle 483, a mirror 484, a semitransparent mirror 485, a beam splitter 486, a lens 487, and an observation camera 488. The visible light source 481 emits visible light V along the Z-axis direction. The plurality of lenses 482 collimates the visible light V emitted from the visible light source 481. The reticle 483 gives a scale line to the visible light V. The mirror 484 reflects the visible light V collimated by the plurality of lenses 482 in the X-axis direction. The semitransparent mirror 485 divides the visible light V reflected by the mirror 484 into a reflection component and a transmission component. The visible light V reflected by the semitransparent mirror 485 is sequentially transmitted through the beam splitter 486 and the dichroic mirror 403 along the Z-axis direction, and is emitted via the converging lens unit 430 to the object to be processed 1 supported by the support table 230 (See FIG. 7).

The visible light V emitted to the object to be processed 1 is reflected by the laser light entrance surface of the object to be processed 1, enters the dichroic mirror 403 via the converging lens unit 430, and is transmitted through the dichroic mirror 403 along the Z-axis direction. The beam splitter 486 divides the visible light V transmitted through the dichroic mirror 403 into a reflection component and a transmission component. The visible light V transmitted through the beam splitter 486 is transmitted through the semitransparent mirror 485 and sequentially enters the lens 487 and the observation camera 488 along the Z-axis direction. The lens 487 converges the entering visible light V on an imaging surface of the observation camera 488. In the laser processing device 200, an imaging result by the observation camera 488 is observed, whereby a state of the object to be processed 1 can be grasped.

The mirror 484, the semitransparent mirror 485, and the beam splitter 486 are arranged in a holder 407 attached on the end 401d of the housing 401. The plurality of lenses 482 and the reticle 483 are arranged in a cylindrical body 408 erected on the holder 407 along the Z-axis direction, and the visible light source 481 is arranged at an end of the cylindrical body 408. The lens 487 is arranged in a cylindrical body 409 erected on the holder 407 along the Z-axis direction, and the observation camera 488 is arranged at an end of the cylindrical body 409. The cylindrical body 408 and the cylindrical body 409 are arranged side by side in the X-axis direction. Note that, each of the visible light V transmitted through the semitransparent mirror 485 along the X-axis direction and the visible light V reflected in the X-axis direction by the beam splitter 486 may be absorbed by a damper or the like provided on a wall portion of the holder 407, or may be used for an appropriate purpose.

In this case, the laser light L emitted to an object to be processed 1 is reflected by a laser light entrance surface of the object to be processed 1, is sequentially transmitted through a dichroic mirror 403, a beam splitter 486, and the semitransparent mirror 485 via a converging lens unit 430, and sequentially enters a lens 487 and an observation camera 488 along the Z-axis direction. The lens 487 converges the entering laser light L on an imaging surface of the observation camera 488. Therefore, in the laser processing device 200, as described below, a reflected light amount of the laser light L on the laser light entrance surface of the object to be processed 1 can be acquired by observing (for example, image processing) an imaging result by the observation camera 488.

In the laser processing device 200, replacement of the laser output unit 300 is assumed. This is because the wavelength of the laser light L suitable for processing varies depending on the specifications of the object to be processed 1, processing conditions, and the like. For that reason, a plurality of laser output units 300 is prepared having respective wavelengths of emitting laser light L different from each other. Here, prepared are the laser output unit 300 in which the wavelength of the emitting laser light L is included in the wavelength band of from 500 nm to 550 nm, the laser output unit 300 in which the wavelength of the emitting laser light L is included in the wavelength band of from 1000 nm to 1150 nm, and the laser output unit 300 in which the wavelength of the emitting laser light L is included in the wavelength band of from 1300 nm to 1400 nm.

On the other hand, in the laser processing device 200, replacement of the laser converging unit 400 is not assumed. This is because the laser converging unit 400 is adapted to multiple wavelengths (adapted to a plurality of wavelength bands non-contiguous with each other). Specifically, the mirror 402, the reflective spatial light modulator 410, the pair of lenses 422 and 423 of the 4f lens unit 420, the dichroic mirror 403, the lens 432 of the converging lens unit 430, and the like are adapted to the multiple wavelengths.

Here, the laser converging unit 400 is adapted to the wavelength bands of from 500 nm to 550 nm, from 1000 nm to 1150 nm, and from 1300 nm to 1400 nm. This is implemented by designing the components of the laser converging unit 400 so as to satisfy desired optical performance, such as coating the components of the laser converging unit 400 with a predetermined dielectric multilayer film. Note that, in the laser output unit 300, the $\lambda/2$ wave plate unit 330 includes a $\lambda/2$ wave plate, and the polarizing plate unit 340 includes a polarizing plate. The $\lambda/2$ wave plate and the polarizing plate are optical devices having high wavelength dependence. For that reason, the $\lambda/2$ wave plate unit 330 and the polarizing plate unit 340 are provided in the laser output unit 300 as different components for each wavelength band.

[Optical Path and Polarization Direction of Laser Light in Laser Processing Device]

In the laser processing device 200, as illustrated in FIG. 11, the polarization direction of the laser light L converged at the object to be processed 1 supported by the support table 230 is a direction parallel to the X-axis direction, and coincides with the processing direction (scanning direction of the laser light L). Here, in the reflective spatial light modulator 410, the laser light L is reflected as P-polarized light. This is because in a case where a liquid crystal is used for the light modulation layer of the reflective spatial light modulator 410, when the liquid crystal is oriented such that the liquid crystal molecules are inclined in a surface parallel to the plane including the optical axis of the laser light L entering and exiting the reflective spatial light modulator 410, phase modulation is applied to the laser light L in a state where the rotation of the plane of polarization is inhibited (for example, see Japanese Patent No. 3878758).

On the other hand, in the dichroic mirror 403, the laser light L is reflected as S-polarized light. This is because, for example, when the laser light L is reflected as the S-polarized light rather than when the laser light L is reflected as the P-polarized light, the number of coatings is reduced of the dielectric multilayer film for making the dichroic mirror 403 adapt to the multiple wavelengths, and designing of the dichroic mirror 403 becomes easier.

Therefore, in the laser converging unit 400, the optical path from the mirror 402 via the reflective spatial light modulator 410 and the 4f lens unit 420 to the dichroic mirror 403 is set along the XY plane, and the optical path from the dichroic mirror 403 to the converging lens unit 430 is set along the Z-axis direction.

As illustrated in FIG. 9, in the laser output unit 300, the optical path of the laser light L is set along the X-axis direction or the Y-axis direction. Specifically, the optical path from the laser oscillator 310 to the mirror 303, and the optical path from the mirror 304 via the λ/2 wave plate unit 330, the polarizing plate unit 340, and the beam expander 350 to the mirror unit 360 are set along the X-axis direction, and the optical path from the mirror 303 via the shutter 320 to the mirror 304, and the optical path from the mirror 362 to the mirror 363 in the mirror unit 360 are set along the Y-axis direction.

Here, as illustrated in FIG. 11, the laser light L having traveled to the laser converging unit 400 from the laser output unit 300 along the Z-axis direction is reflected by the mirror 402 in a direction parallel to the XY plane, and enters the reflective spatial light modulator 410. At this time, in the plane parallel to the XY plane, an acute angle α is formed by the optical axis of the laser light L entering the reflective spatial light modulator 410 and the optical axis of the laser light L emitted from the reflective spatial light modulator 410. On the other hand, as described above, in the laser output unit 300, the optical path of the laser light L is set along the X-axis direction or the Y-axis direction.

Therefore, in the laser output unit 300, it is necessary to cause the λ/2 wave plate unit 330 and the polarizing plate unit 340 to function not only as the attenuator 550 configured to adjust the output of the laser light L but also as the polarization direction adjusting unit configured to adjust the polarization direction of the laser light L.

[4f Lens Unit]

Figure 14:
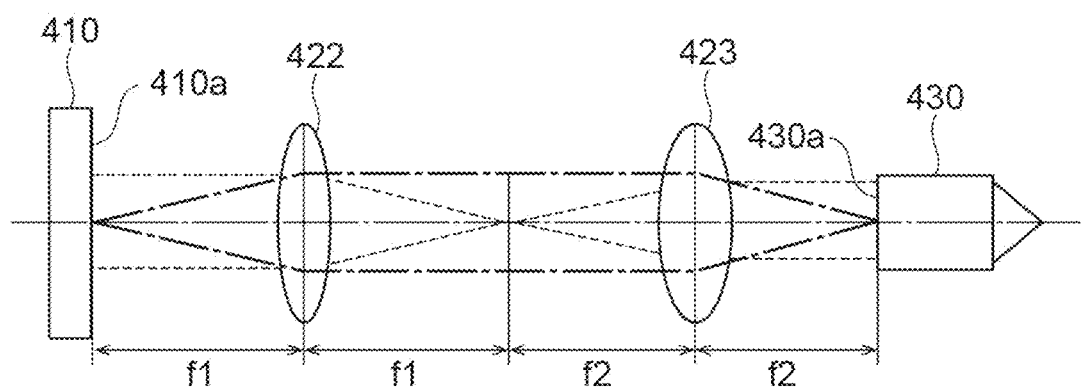
FIG. 14 is a diagram illustrating an optical arrangement relationship among a reflective spatial light modulator, a 4f lens unit, and a converging lens unit in the laser converging unit of FIG. 11.

As described above, the pair of lenses 422 and 423 of the 4f lens unit 420 constitutes the double telecentric optical system in which the reflective surface 410a of the reflective spatial light modulator 410 and the entrance pupil plane 430a of the converging lens unit 430 are in the imaging relationship. Specifically, as illustrated in FIG. 14, the distance of the optical path between the center of the lens 422 on the reflective spatial light modulator 410 side and the reflective surface 410a of the reflective spatial light modulator 410 is a first focal length f1 of the lens 422, the distance of the optical path between the center of the lens 423 on the converging lens unit 430 side and the entrance pupil plane 430a of the converging lens unit 430 is a second focal length f2 of the lens 423, and the distance of the optical path between the center of the lens 422 and the center of the lens 423 is a sum of the first focal length f1 and the second focal length f2 (that is, f1+f2). In the optical path from the reflective spatial light modulator 410 to the converging lens unit 430, the optical path between the pair of lenses 422 and 423 is a straight line.

In the laser processing device 200, from a viewpoint of increasing an effective diameter of the laser light L on the reflective surface 410a of the reflective spatial light modulator 410, a magnification M of the double telecentric optical system satisfies 0.5<M<1 (reduction system). As the effective diameter is increased of the laser light L on the reflective surface 410a of the reflective spatial light modulator 410, the laser light L is modulated with a high-precision phase pattern. From the viewpoint of inhibiting the optical path from becoming longer of the laser light L from the reflective spatial light modulator 410 to the converging lens unit 430, it is more preferable to set 0.6≤M≤0.95. Here, (the magnification M of the double telecentric optical system)=(the size of the image on the entrance pupil plane 430a of the converging lens unit 430)/(the size of the object on the reflective surface 410a of the reflective spatial light modulator 410). In the case of the laser processing device 200, the magnification M of the double telecentric optical system, the first focal length f1 of the lens 422, and the second focal length f2 of the lens 423 satisfy M=f2/f1.

From a viewpoint of reducing the effective diameter of the laser light L on the reflective surface 410a of the reflective spatial light modulator 410, the magnification M of the double telecentric optical system may satisfy 1<M<2 (enlargement system). As the effective diameter is reduced of the laser light L on the reflective surface 410a of the reflective spatial light modulator 410, the magnification can be reduced of the beam expander 350 (see FIG. 9), and in the plane parallel to the XY plane, the angle α (see FIG. 11) is reduced formed by the optical axis of the laser light L entering the spatial light modulator 410 and the optical axis of the laser light L emitted from the reflective spatial light modulator 410. From the viewpoint of inhibiting the optical path from becoming longer of the laser light L from the reflective spatial light modulator 410 to the converging lens unit 430, it is more preferable to set 1.05≤M≤1.7.

[Reflective Spatial Light Modulator]

Figure 15:
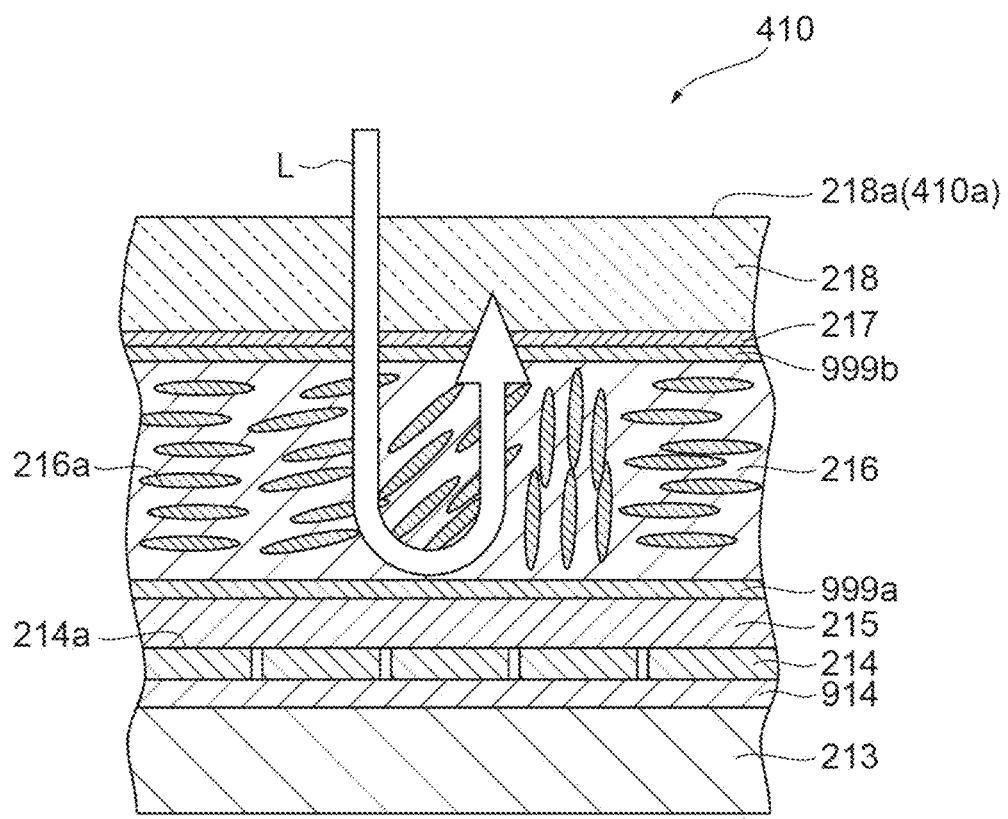
FIG. 15 is a partial sectional view of a reflective spatial light modulator in the laser processing device of FIG. 7.

As illustrated in FIG. 15, the reflective spatial light modulator 410 includes a silicon substrate 213, a drive circuit layer 914, a plurality of pixel electrodes 214, a reflective film 215 such as a dielectric multilayer mirror, an alignment film 999a, a liquid crystal layer (modulation layer) 216, an alignment film 999b, a transparent conductive film 217, and a transparent substrate 218 such as a glass substrate, which are stacked in this order.

The transparent substrate 218 includes a front surface 218a. As described above, the front surface 218a can be regarded as substantially constituting the reflective surface 410a of the reflective spatial light modulator 410, but more specifically, the front surface 218a is an entrance surface at which the laser light L enters. That is, the transparent substrate 218 is made of a light transmitting material such as glass, for example, and transmits the laser light L entering from the front surface 218a of the reflective spatial light modulator 410 to the inside of the reflective spatial light modulator 410. The transparent conductive film 217 is formed on a back surface of the transparent substrate 218, and includes a conductive material (for example, ITO) which transmits therethrough the laser light L.

The plurality of pixel electrodes 214 is arranged in a matrix on the silicon substrate 213 along the transparent conductive film 217. Each of the pixel electrodes 214 is made of a metal material such as aluminum, for example, while its front surface 214a is processed flat and smooth. The front surface 214a reflects the laser light L entering from the front surface 218a of the transparent substrate 218 toward the front surface 218a. That is, the reflective spatial light modulator 410 includes the front surface 218a at which the laser light L enters, and the front surface 214a configured to reflect the laser light L entering from the front surface 218a, toward the front surface 218a. The plurality of pixel electrodes 214 are driven by an active matrix circuit provided in the drive circuit layer 914.

The active matrix circuit is provided between the plurality of pixel electrodes 214 and the silicon substrate 213, and controls an applied voltage to each of the pixel electrodes 214 in accordance with a light image to be output from the reflective spatial light modulator 410. Such an active matrix circuit includes a first driver circuit configured to control the applied voltage for pixel rows arranged in the X-axis direction, and a second driver circuit configured to control the applied voltage for pixel rows arranged in the Y-axis direction, which are not illustrated, for example, and a predetermined voltage is applied to the pixel electrode 214 of a pixel specified by the driver circuits, by the controller 500.

The alignment films 999a, 999b are arranged on both end surfaces of the liquid crystal layer 216, respectively, so as to align a group of liquid crystal molecules in a fixed direction. The alignment films 999a, 999b are made of a polymer material such as polyimide, of which surfaces coming into contact with the liquid crystal layer 216 are subjected to rubbing, and the like.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when a voltage is applied to the pixel electrodes 214 by the active matrix circuit of the drive circuit layer 914, an electric field is formed between the transparent conductive film 217 and the pixel electrodes 214, and the alignment direction of liquid crystal molecules 216a changes according to a magnitude of the electric field formed in the liquid crystal layer 216. When the laser light L enters the liquid crystal layer 216 through the transparent substrate 218 and the transparent conductive film 217, the laser light L is modulated by the liquid crystal molecules 216a while passing through the liquid crystal layer 216, and reflected by the reflective film 215, and then modulated again by the liquid crystal layer 216, and emitted.

At this time, the voltage applied to each of the pixel electrodes 214 is controlled by the controller 500, and, in accordance with the voltage, a refractive index changes in a portion sandwiched between the transparent conductive film 217 and each of the pixel electrodes 214 in the liquid crystal layer 216 (the refractive index changes of the liquid crystal layer 216 at a position corresponding to each pixel). Due to the change in the refractive index, the phase of the laser light L can be changed for each pixel of the liquid crystal layer 216 in accordance with the voltage applied. That is, phase modulation corresponding to the hologram pattern can be applied by the liquid crystal layer 216 for each pixel.

In other words, a modulation pattern as the hologram pattern applying the modulation can be displayed on the liquid crystal layer 216 of the reflective spatial light modulator 410. The wavefront is adjusted of the laser light L that enters and is transmitted through the modulation pattern, and shifts occur in phases of components of individual rays constituting the laser light L in a predetermined direction orthogonal to their traveling direction. Therefore, the laser light L can be modulated (for example, intensity, amplitude, phase, and polarization of the laser light L can be modulated) by appropriately setting the modulation pattern to be displayed in the reflective spatial light modulator 410.

In other words, depending on the voltage applied to each pixel electrode 214, a refractive index distribution is generated in the liquid crystal layer 216 along the arrangement direction of the pixel electrodes 214, and a phase pattern that can apply phase modulation to the laser light L is displayed on the liquid crystal layer 216. That is, the reflective spatial light modulator 410 includes the liquid crystal layer (modulation layer) 216 arranged between the front surface 218a and the front surface 214a and configured to display the phase pattern to modulate the laser light L.

Embodiment of Laser Processing Device

Figure 16:
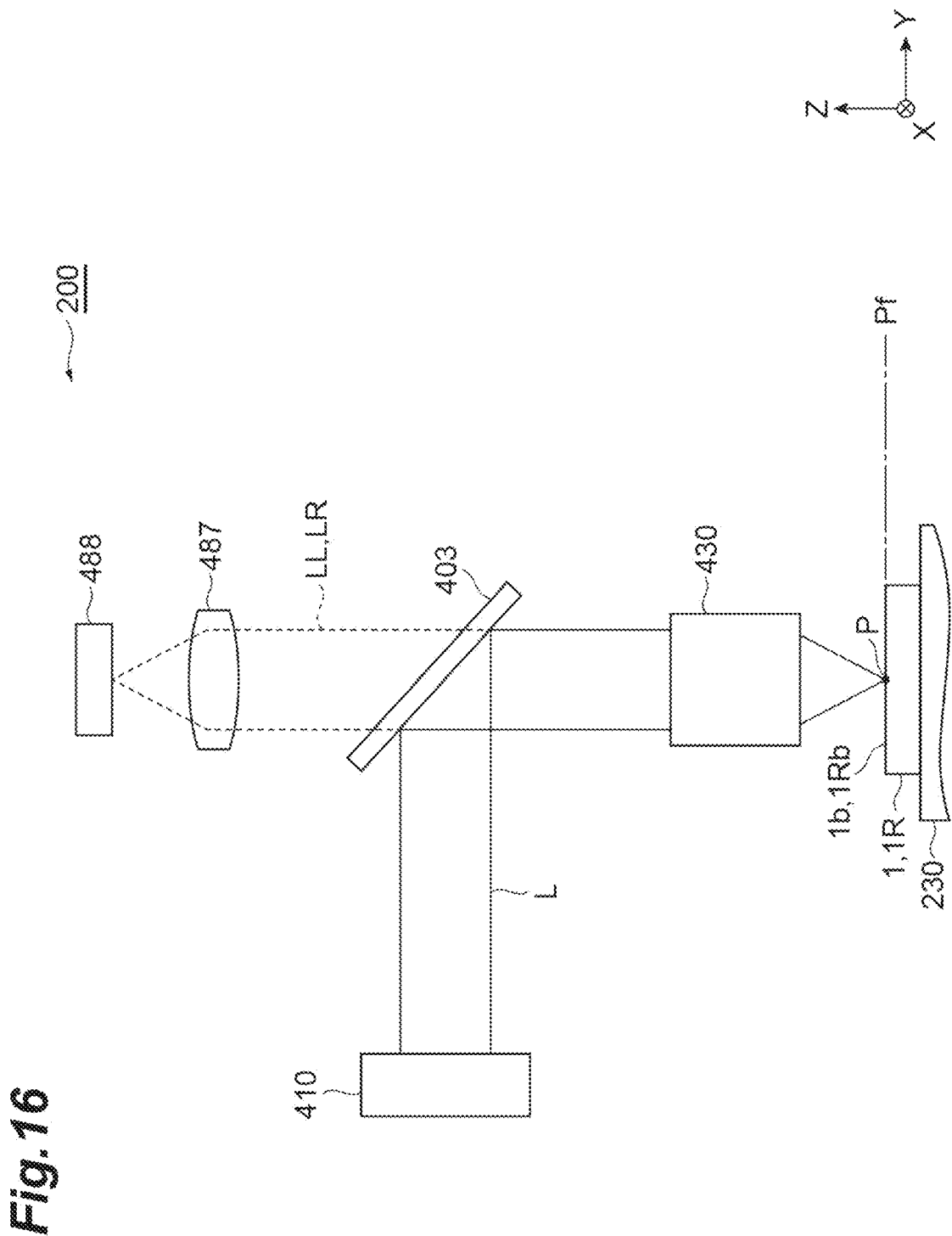
FIG. 16 is a partial schematic diagram of the laser processing device illustrated in FIG. 7.

In the laser processing device 200, even if a reflectance of the laser light entrance surface of the object to be processed 1 is unknown with respect to the wavelength (hereinafter, referred to as "first wavelength") of the laser light L (for example, the laser light L) of the object to be processed 1, it is possible to perform suitable processing. The configuration of the laser processing device 200 for that purpose will be described with reference to a schematic diagram. FIG. 16 is a partial schematic diagram of the laser processing device illustrated in FIG. 7. As illustrated in FIGS. 7, 9, 12, and 16, the laser processing device 200 includes the support table 230, the second moving mechanism (moving mechanism) 240, the laser oscillator (laser light source) 310, the lens (converging lens) 487, the observation camera (camera) 488, the reflective spatial light modulator (spatial light modulator) 410, and the controller 500.

The support table 230 supports the object to be processed 1 and a reference wafer (reference object) 1R described later. The laser oscillator 310 outputs the laser light L. The converging lens unit 430 converges the laser light L and forms the converging point P toward the back surface (first surface) 1b of the object to be processed 1 supported by the support table 230 or the reference surface 1Rb of the reference wafer 1R supported by the support table 230. The reflective spatial light modulator 410 is arranged on the optical path of the laser light L between the laser oscillator 310 and the converging lens unit 430, and modulates the laser light L according to the modulation pattern.

The lens 487 converges reflected light LL of the laser light L from the back surface 1b and reflected light LR of the laser light L from the reference surface 1Rb toward the observation camera 488. The observation camera 488 images the reflected light LL of the laser light L from the back surface 1b and the reflected light LR of the laser light L from the reference surface 1Rb. The second moving mechanism 240 moves the support table 230 along the Z-axis direction (the direction intersecting the back surface 1b and the reference surface 1Rb). The controller 500 controls each unit of the laser processing device 200, performs arithmetic processing, and the like. The controller 500 controls, for example, the second moving mechanism 240, the laser oscillator 310, the reflective spatial light modulator 410, and the observation camera 488.

In the laser processing device 200, the laser light L output from the laser oscillator 310 is modulated and reflected by the reflective spatial light modulator 410, and then reflected toward the converging lens unit 430 by the dichroic mirror 403. The laser light L entering the converging lens unit 430 is converged toward the back surface 1b of the object to be processed 1 on the support table 230 or the reference surface 1Rb of the reference wafer 1R by the converging lens unit 430, and is applied to the back surface 1b or the reference surface 1Rb. The reflected lights LL and LR from the back surface 1b and the reference surface 1Rb enter the lens 487 through the converging lens unit 430 and the dichroic mirror 403. The reflected lights LL and LR entering the lens 487 enter the observation camera 488 while being converged by the lens 487, and are used for imaging by the observation camera 488.

The converging lens unit 430 and the lens 487 are adjusted so that the back surface 1b and the reference surface 1Rb and the imaging surface of the observation camera 488 form a conjugate plane. Therefore, when the back surface 1b and the reference surface 1Rb are arranged at a focal position Pf of the converging lens unit 430, a spot S1 of the laser light L on the back surface 1b and the reference surface 1Rb and a spot Sc of the reflected lights LL and LR on the observation camera 488 have the same shape, as shown in FIG. 17.

In the laser processing device 200 as described above, the controller 500 executes acquisition processing of irradiating the back surface 1b with the laser light L under the control of the laser oscillator 310 and imaging the reflected light LL under the control of the observation camera 488 to acquire the reflectance of the back surface 1b with respect to the first wavelength. In particular, before executing the acquisition processing, the controller 500 executes modulation processing of causing the reflective spatial light modulator 410 to present the modulation pattern for lowering the power density of the laser light L on the back surface 1b.

This point will be described more specifically. In the acquisition processing, the controller 500 executes first processing of acquiring a first light amount, which is an amount of the reflected light LL from the back surface 1b, by imaging the reflected light LL from the back surface 1b. Furthermore, in the acquisition processing, the controller 500 executes second processing of irradiating the reference wafer 1R, having the reference surface 1Rb of which reflectance for the first wavelength is known, with the laser light L from the reference surface 1Rb side under the control of the laser oscillator 310, and acquiring a reference light amount, which is an amount of the reflected light LR, by imaging the reflected light LR from the reference surface 1Rb under the control of the observation camera 488. The order of the first processing and the second processing may be reversed. Then, the controller 500 executes third processing of calculating the reflectance of the back surface 1b with respect to the first wavelength based on the reflectance of the reference surface 1Rb with respect to the first wavelength, the first light amount, and the reference light amount.

As described above, when the controller 500 acquires the reflectance of the back surface 1b of the object to be processed 1 by the acquisition processing, the back surface 1b is irradiated with the laser light L. At this time, if the power density of the laser light L on the back surface 1b exceeds a processing threshold of the object to be processed 1, the back surface 1b may be damaged. Thus, the controller 500 executes the modulation processing for causing the reflective spatial light modulator 410 to present the modulation pattern for lowering the power density of the laser light L on the back surface 1b so as to prevent the back surface 1b from being damaged. Subsequently, a specific example of the modulation processing will be described.

As an example of the modulation processing, the controller 500 can execute focus shift that shifts the converging point P of the laser light L from the back surface 1b. In the focus shift, the controller 500 causes the reflective spatial light modulator 410 to present a shift pattern SP (see (a) of FIG. 19), which is a modulation pattern for shifting the converging point P of the laser light L from the back surface 1b.

Figure 18:
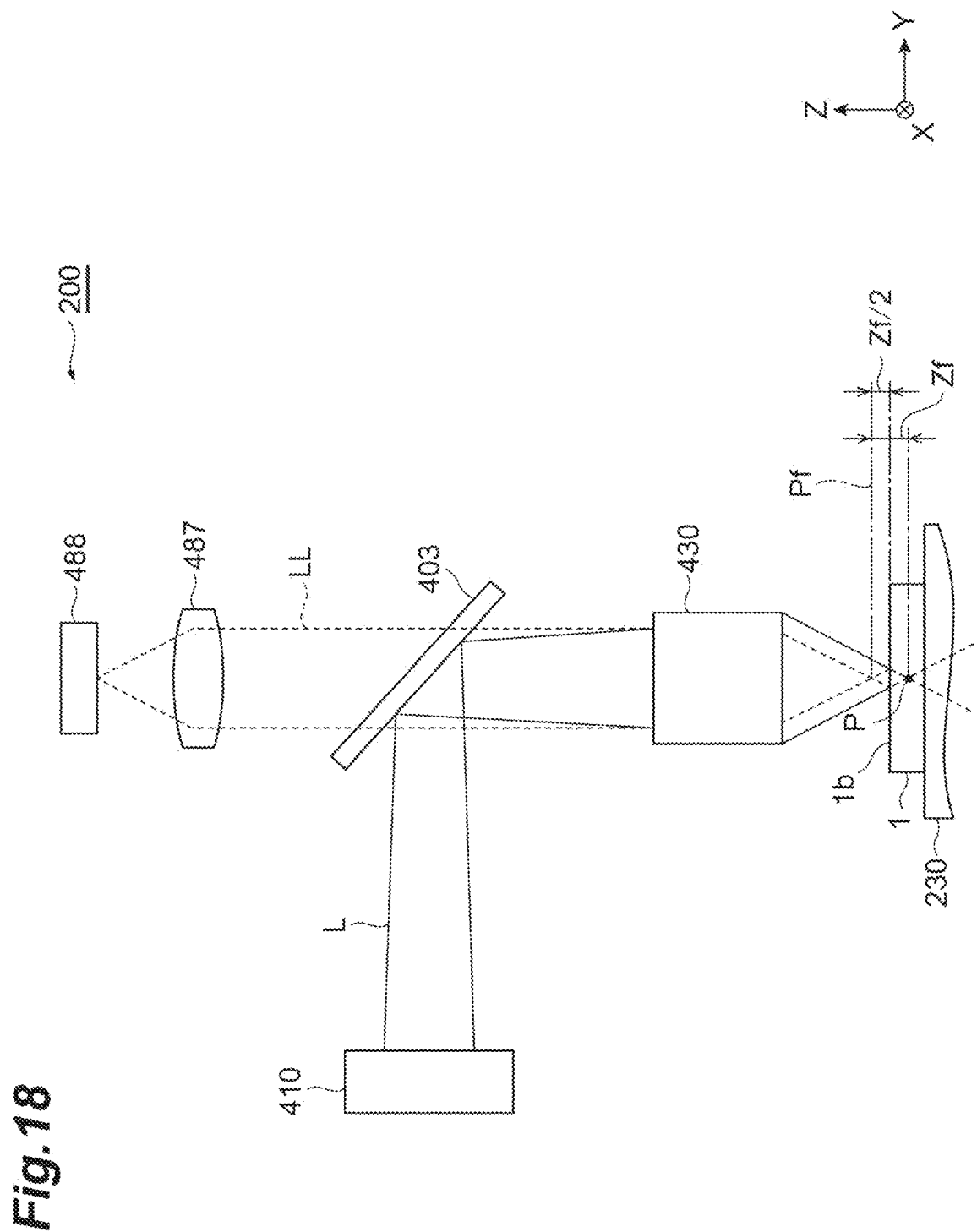
FIG. 18 is a partial schematic view of the laser processing device shown in FIG. 7, illustrating a state of focus shift by a controller.

As shown in FIG. 18, in this case, the shift pattern SP is a lens pattern that converges the laser light L modulated/reflected by the reflective spatial light modulator 410 to enter the converging lens unit 430 while diverging through the dichroic mirror 403. Thus, the converging point P is shifted from the focal position Pf of the converging lens unit 430 to the opposite side from the converging lens unit 430 along the Z-axis direction by a shift amount Zf. As a result, as shown in (b) of FIG. 19, the spot S1 of the laser light L is expanded (defocused) on the back surface 1b, and the power density is lowered. In this case, the shift pattern SP is a pattern that introduces the same shift amount Zf in both the X-axis direction (inside the XZ plane) and the Y-axis direction (inside the YZ plane).

Here, when the controller 500 causes the reflective spatial light modulator 410 to present the shift pattern SP and shifts the converging point P from the back surface 1b, the controller 500 moves the support table 230 by the second moving mechanism 240 so that the reflected light LL from the back surface 1b is converged to the observation camera 488. More specifically, as shown in FIG. 18, the controller 500 moves the support table 230 to the opposite side from the converging lens unit 430 along the Z-axis direction by Zf/2 with respect to the shift amount Zf of the converging point P by the second moving mechanism 240. Thus, as shown in (c) of FIG. 19, the reflected light LL is converged on the observation camera 488, and the shape of the spot Sc on the observation camera 488 is maintained as prior to focus shift processing. As a result, while lowering the power density of the laser light on the back surface 1b, the lowering of the power density of the reflected light is suppressed on the observation camera 488 to ensure a sufficient luminance.

Figure 20:
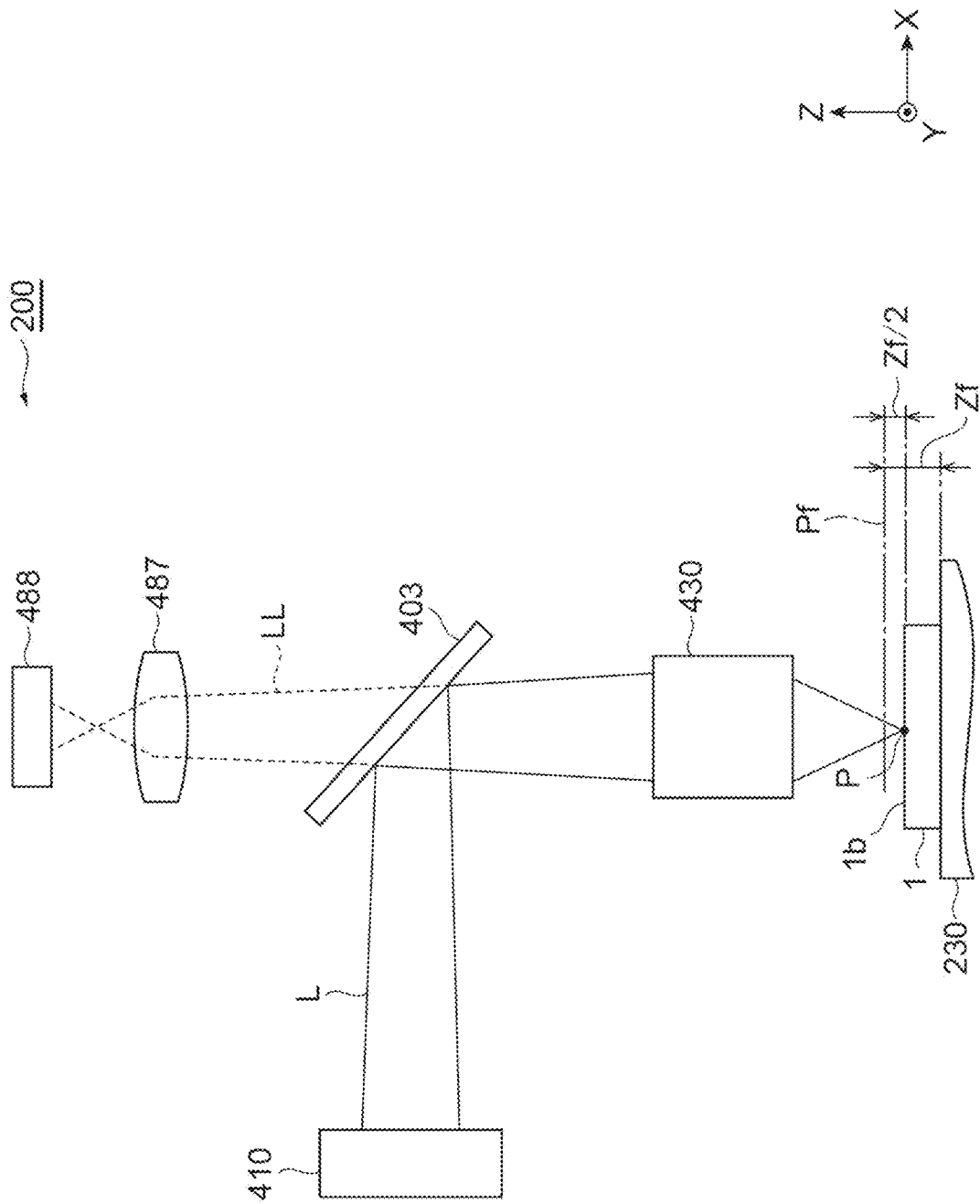
FIG. 20 is a partial schematic view of the laser processing device shown in FIG. 7, illustrating the state of focus shift by the controller.

The controller 500 can introduce different shift amounts in the X-axis direction (inside the XZ plane) and in the Y-axis direction (inside the YZ plane) by controlling the shift pattern presented to the reflective spatial light modulator 410. More specifically, by controlling the shift pattern, the controller 500 can introduce the shift amount Zf as shown in FIG. 18 in the YZ plane, for example, and can introduce a shift amount Zf/2, which is half the shift amount Zf as shown in FIG. 20 in the XZ plane.

Thus, as shown in FIG. 21, the spot S1 of the laser light L on the back surface 1b is formed in an elliptical shape elongated in the Y-axis direction, and the spot Sc of the reflected light LL on the observation camera 488 is formed in an elliptical shape elongated in the X-axis direction. As a result, it is possible to deal with a case where an entrance area of the laser light on the back surface 1b is limited while lowering the power density of the laser light L on the back surface 1b. The entrance area is limited, for example when a plurality of devices are formed on the back surface 1b and an area where the laser light L can enter is limited to an elongated area between the devices adjacent to each other.

Subsequently, another example of the modulation processing executed by the controller 500 will be described. As another example of the modulation processing, the controller 500 can deform a spot to cause the reflective spatial light modulator 410 to present a spot deformation pattern SD (see (a) of FIG. 22), which is a modulation pattern for changing the spot shape of the laser light L on the back surface 1b. In an example of (a) of FIG. 22, the spot deformation pattern SD is a pattern having a spiral phase distribution and generates a Laguerre Gaussian beam.

In this case, in the spot S1 of the laser light L on the back surface 1b, as compared with a case of normal converging (in a case of Gaussian beam) illustrated in (b) of FIG. 22, as illustrated in (a) to (c) of FIG. 23, as the spot S1 is expanded, the power density at the center is lowered. The spots S1 illustrated in (a) to (c) of FIG. 23 have different numbers of spirals in the phase distribution of the spot deformation pattern SD forming the spot S1. (a) of FIG. 23 shows a case where the number of spirals is 1, (b) of FIG. 23 shows a case where the number of spirals is 2 (the case of (a) of FIG. 22), and (c) of FIG. 23 shows a case where the number of spirals is 5.

Although the spot S1 is also deformed in FIG. 21, in this case, a shift (focus shift) of the converging point P is involved. The spot deformation pattern SD in this case does not involve focus shift. Thus, a state in which the reflected light LL is converged on the observation camera 488 can be maintained in a without moving the support table 230.

Therefore, it is possible to lower the power density of the laser light L on the back surface 1b while suppressing a difference between a state of the spot S1 of the laser light L on the back surface 1b and a state of the spot Sc of the reflected light LL on the observation camera 488. However, the controller 500 may perform focus shift and spot deformation at the same time by presenting, for example, a pattern in which the shift pattern SP and the spot deformation pattern SD are superimposed to the reflective spatial light modulator 410.

Another effect can be obtained by performing such spot deformation. FIG. 24 is a graph for explaining an effect. (a) of FIG. 24 illustrates a Gaussian beam G, a Laguerre Gaussian beam LG2 generated by the spot deformation pattern SD in which the number of spirals in the phase distribution is 2, and a relationship between a defocus value of a Laguerre Gaussian beam LG4, generated by the spot deformation pattern SD in which the number of spirals in the phase distribution is 4, and a peak value of the power density. (b) of FIG. 24 is a diagram illustrating the Gaussian beam G the Laguerre Gaussian beam LG2, and a relationship between the defocus value of the Laguerre Gaussian beam LG4 and the sum of luminance values. The defocus value is the shift amount of the converging point of each beam from the focal position of the converging lens. The sum of luminance values is the sum of luminance values in a circle (aperture) for obtaining a luminance range set at the center of the observation camera 488.

As shown in (a) of FIG. 24, the Laguerre Gaussian beams LG2 and LG4 have a gradual change in the peak value with respect to a change in the defocus value as compared with the Gaussian beam G Thus, as shown in (b) of FIG. 24, in the Laguerre Gaussian beams LG2 and LG4, the sum of luminance values is stable with respect to the change in the defocus value as compared with the Gaussian beam G Therefore, by using the spot deformation pattern SD and setting the laser light L to the Laguerre Gaussian beams LG2 and LG4, deterioration of measurement accuracy can be prevented. Furthermore, by using the spot deformation pattern SD and setting the laser light L to the Laguerre Gaussian beams LG2 and LG4, insufficiency of the luminance value in the observation camera 488 is unlikely to occur with respect to the change in the defocus value, and insufficiency of a dynamic range of the observation camera 488 is unlikely to occur.

In the above example, the spot deformation pattern SD is the pattern for generating the Laguerre Gaussian beam. However, the spot deformation pattern SD is not limited to this pattern, and may be, for example, a pattern for generating a tophat beam or another pattern.

Embodiment of Laser Processing Method

Subsequently, details of the operation of the laser processing device 200 will be described by explaining a laser processing method using the laser processing device 200 described above. First, an outline of the laser processing method according to the present embodiment will be described. In this laser processing method, first, the laser light L of the first wavelength is emitted from the reference surface 1Rb side to the reference wafer 1R having the reference surface 1Rb of which reflectance for the first wavelength is known, whereby the reference light amount is acquired as the reflected light amount of the laser light L on the reference surface 1Rb (first step).

Subsequently, the same laser light L is emitted from the back surface 1b side, which is the laser light entrance surface of the object to be processed 1, to the object to be processed 1, whereby the first light amount is acquired as the reflected light amount of the laser light L on the back surface 1b (second step). The order of the first step and the second step may be reversed. Subsequently, after the first step and the second step, a reflectance of the back surface 1b for the first wavelength is calculated based on the known reflectance of the reference wafer 1R, the reference light amount, and the first light amount (third step).

Then, after the third step, an emitting condition of the processing laser light L is adjusted according to the reflectance of the back surface 1b calculated in the third step, and the processing laser light L is emitted from the back surface 1b side to the object to be processed 1 under the adjusted emitting condition, whereby laser processing for forming a modified region 7 at least inside the object to be processed 1 is performed (fourth step).

As illustrated in FIG. 25 and as described above, in this laser processing method, a back surface 1b of the object to be processed 1 is a laser light entrance surface. As an example, in the fourth step, modified regions 7a and 7b are respectively formed at two different positions in the thickness direction (the direction from the front surface 1a to the back surface 1b (Z-axis direction)) of the object to be processed 1.

In the case of (a) of FIG. 25, by controlling an image pattern (modulation pattern) presented to a reflective spatial light modulator 410, the laser light L is split into laser lights L1 and L2, and the laser lights L1 and L2 are converged at different positions in the thickness direction of the object to be processed 1. That is, a converging point P1 of the laser light L1 and a converging point P2 of the laser light L2 are generated at different positions in the Z-axis direction. This makes it possible to form two rows of the modified regions 7a and 7b by one scan. Hereinafter, this case may be referred to as a bifocal processing mode. In this case, the converging point P1 and the converging point P2 are also located at different positions in the scanning direction (X-axis direction). A distance between the converging points P1 and P2 in the Z-axis direction is defined as a distance Dv, and a distance between the converging points P1 and P2 in the X-axis direction is defined as Dh.

On the other hand, in the case of (b) of FIG. 25, by controlling a modulation pattern presented to the reflective spatial light modulator 410, the laser light L is not split into a plurality of lights, and two scans are performed with changing the position in the Z-axis direction, whereby two rows of the modified regions 7a and 7b are formed at different positions in the Z-axis direction. That is, a plurality of rows of the modified regions 7a and 7b are formed by a relative movement of one converging point P of the laser light L. Hereinafter, this case may be referred to as a monofocal processing mode. These two cases (modes) can be selected according to the upper limit of an output value of the laser light L, the reflectance of the laser light entrance surface (in the present embodiment, the back surface 1b) of the object to be processed 1, and the like, as described later.

Figure 26:
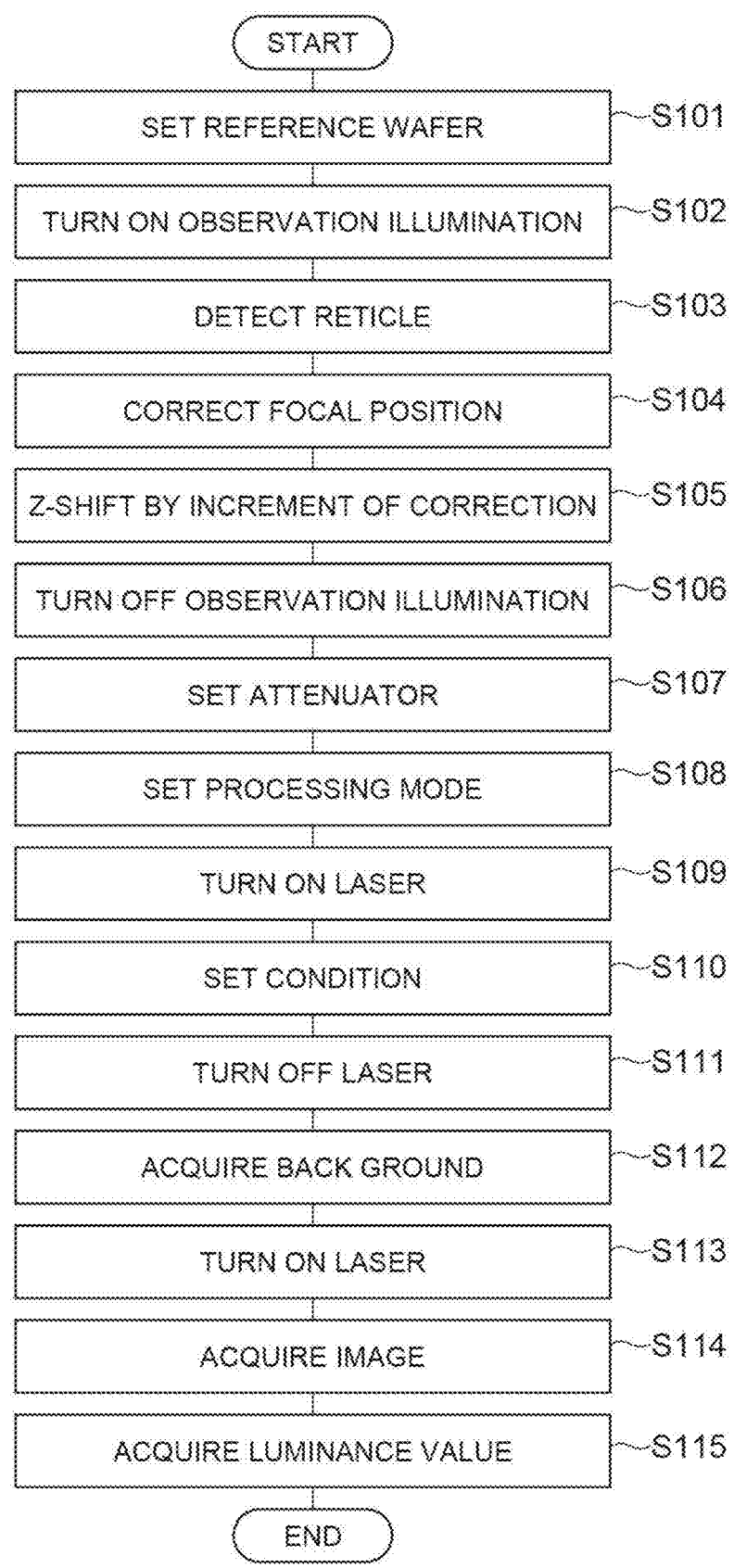
FIG. 26 is a flowchart showing a first step of a laser processing method.

Subsequently, details of each step will be described. In each of the following steps, the controller 500 can perform control of each unit, various processes including image processing, and each arithmetic processing including numerical calculation. FIG. 26 is a flowchart showing the first step of the laser processing method according to the present embodiment. As illustrated in FIG. 26, in the first step, first, the reference wafer 1R is set in the laser processing device 200 (Step S101). More specifically, in Step S101, the reference wafer 1R is supported by a support table 230 using an annular frame 11, a film 12, and the like, in the same manner as the object to be processed 1 in FIG. 8. The reference wafer 1R has the reference surface 1Rb of which reflectance for the first wavelength is known. The first wavelength is a wavelength suitable for processing the object to be processed 1. The reference wafer 1R is, for example, a Si wafer.

Subsequently, an observation illumination is turned on (Step S102). More specifically, in Step S102, visible light V is emitted from a visible light source 481 to illuminate the reference surface 1Rb with the visible light V. At this time, as described above, the reticle 483 gives a scale line to the visible light V.

Subsequently, the reticle 483 is detected (Step S103). More specifically, for example, the scale line given by the reticle 483 is detected from an image of reflected light of the visible light V acquired by the observation camera 488. Subsequently, a focal position in the Z-axis direction of the converging lens unit 430 is corrected by adjusting a position of a laser converging unit 400 in the Z-axis direction based on the detection result (Step S104). Subsequently, the laser converging unit 400 is shifted in the Z-axis direction by an increment of the focal position correction in Step S104 so that the converging point P of the laser light L matches the reference surface 1Rb in the Z-axis direction (Step S105). Subsequently, the observation illumination is turned off (Step S106). More specifically, in Step S106, emission of the visible light V from the visible light source 481 is stopped.

Subsequently, the attenuator 550 is set (Step S107). In this case, when the reflected light of the laser light L on the reference surface 1Rb enters the observation camera 488, the output of the laser light L is adjusted by the attenuator 550 so as not to saturate luminance of the observation camera 488 and not to damage the reference surface 1Rb of the reference wafer 1R. As described above, in the first step, the output of the laser light L is adjusted by the attenuator 550 before the measurement laser light L is emitted to the reference wafer 1R. Subsequently, the processing mode is set to the monofocal processing mode (Step S108). In this case, the image pattern input to the reflective spatial light modulator 410 is a monofocal pattern (a pattern in which the laser light L is not split).

Subsequently, the laser output unit 300 is turned on, and emission of the laser light L to the reference surface 1Rb of the reference wafer 1R is started (Step S109). In this state, conditions such as aperture, a laser oscillation mode, and an exposure time are set (Step S110). In setting the aperture, the circle (aperture) for obtaining the luminance range is set at the center of the observation camera 488. In setting the laser oscillation mode, an oscillation mode of a laser oscillator 310 is changed from pulse to CW (continuous wave). However, if an output value of the laser light emitted by pulse oscillation does not exceed a processing threshold of the reference wafer 1R, the oscillation mode may be pulse. When the oscillation mode is CW, pseudo CW may be used.

As described above, in this case, for example, by adjusting the output by the attenuator 550 in Step S107 and changing the oscillation mode in Step S110, the measurement laser light L is generated from a light source common to the processing laser light L, and the measurement laser light L is emitted to the reference wafer 1R along the same optical axis as the processing laser light L.

Subsequently, the laser output unit 300 is turned off, and the emission of the laser light L to the reference surface 1Rb is stopped (Step S111). Thus, the reflected light of the laser light L does not enter the observation camera 488. Subsequently, thus, background is acquired based on the image taken by the observation camera 488 when the reflected light of the laser light L is not input to the observation camera 488 (Step S112).

Then, the laser output unit 300 is turned on again, and the emission of the laser light L to the reference surface 1Rb is started (Step S113). Thus, the reflected light of the laser light L on the reference surface 1Rb enters the observation camera 488. In this state, a first image is acquired by imaging the reflected light of the laser light L on the reference surface 1Rb with the observation camera 488 (Step S114). Then, a luminance value of the reflected light of the laser light L on the reference surface 1Rb is acquired by the image processing of the first image (Step S115). At this time, background correction may be performed based on the background acquired in Step S112.

In this case, the total sum of the luminance values in the aperture (one region) in the first image is acquired, and is normalized by the exposure time, so that the reference light amount is acquired as the reflected light amount of the laser light L on the reference surface 1Rb. That is, in this case, a reference light amount $I_{ref}$ is acquired by calculating reference light amount $I_{ref}$=(total sum of luminance values in aperture)/(exposure time). As an example, when the sum of the luminance values in the aperture is $6.93 \times 10^3$ and the exposure time is 0.5 [ms], the reference light amount $I_{ref}$ is $1.39 \times 10^4$ [l/ms].

Figure 27:
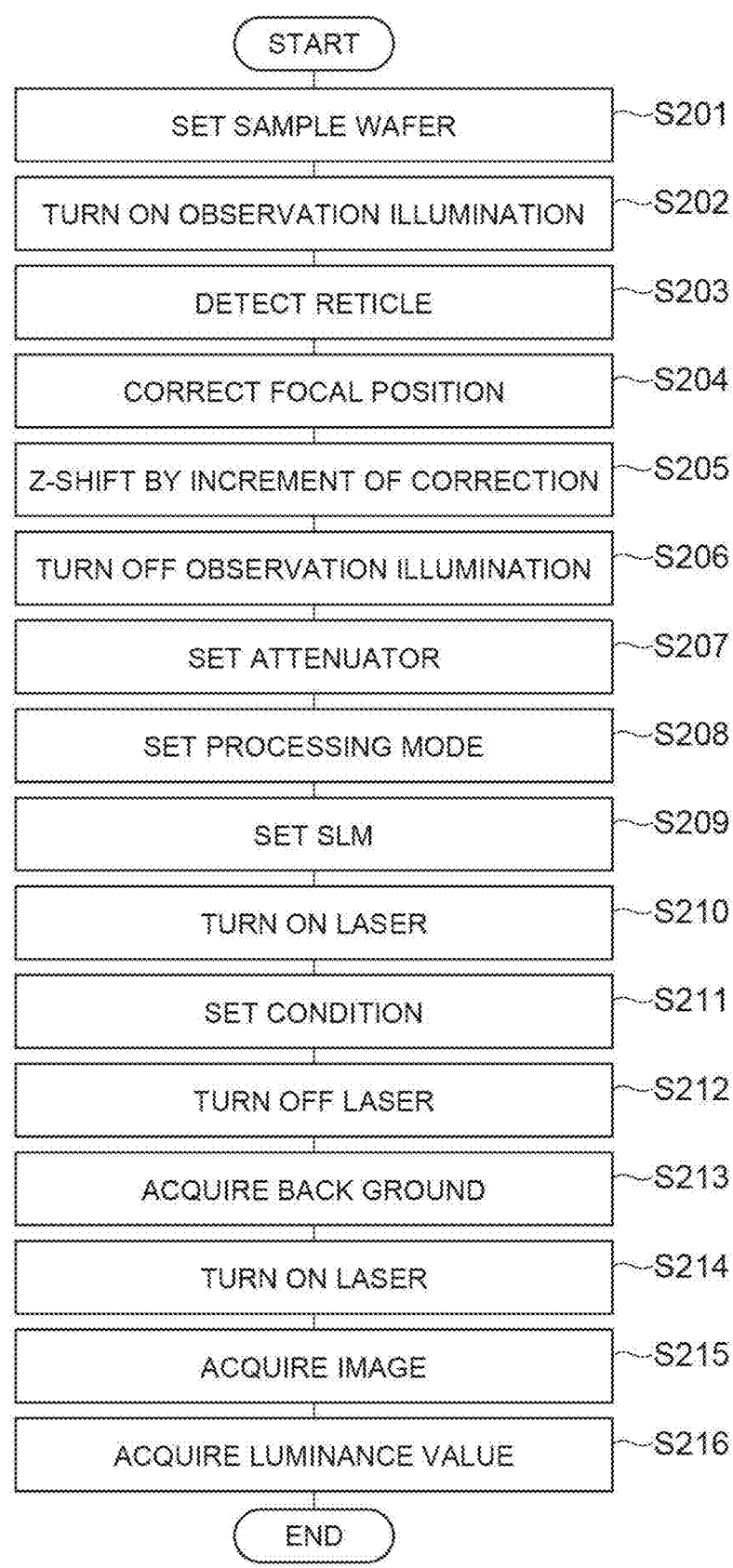
FIG. 27 is a flowchart showing a second step of the laser processing method.

FIG. 27 is a flowchart showing the second step of the laser processing method according to the present embodiment. As illustrated in FIG. 18, in the second step, first, a sample wafer (object to be processed 1) is set in the laser processing device 200 (Step S201). More specifically, in Step S201, as illustrated in FIG. 8, the object to be processed 1 is supported by the support table 230 using the annular frame 11, the film 12, and the like. The object to be processed 1 is, for example, a semiconductor wafer such as Si or a glass wafer having a thin film formed on a wafer surface including a dicing line.

Subsequently, the observation illumination is turned on (Step S202). More specifically, in Step S202, similarly to Step S102 described above, the visible light V is emitted from the visible light source 481 to illuminate the back surface 1b with the visible light V. Subsequently, similarly to Step S103 described above, the reticle 483 is detected (Step S203). Subsequently, a focal position in the Z-axis direction of the converging lens unit 430 is corrected by adjusting the position of the laser converging unit 400 in the Z-axis direction based on the detection result (Step S204). Subsequently, the laser converging unit 400 is shifted in the Z-axis direction by an increment of the focal position correction in Step S204 so that the converging point P of the laser light L matches the back surface 1b in the Z-axis direction (Step S205). Subsequently, similarly to Step S106, the observation illumination is turned off (Step S206).

Subsequently, the attenuator 550 is set (Step S207). In this case, the output of the laser light L is adjusted by the attenuator 550 with the same set value as in Step S107 related to the first step. As described above, also in the second step, the output of the laser light L is adjusted by the attenuator 550 before the laser light L is emitted to the object to be processed 1. Subsequently, similarly to Step S108 described above, the processing mode is set to the monofocal processing mode (Step S208).

Subsequently, the reflective spatial light modulator 410 is set so as to present the modulation pattern for lowering the power density of the laser light L on the back surface 1b (Step S209). In this step S209, the controller 500 lowers the power density of the laser light L on the back surface 1b by executing the modulation processing described above.

Subsequently, similarly to Step S109 described above, the laser output unit 300 is turned on, and the emission of the laser light L to the back surface 1b of the object to be processed 1 is started (Step S210). In this state, conditions such as the aperture, the laser oscillation mode, and the exposure time are set (Step S211). These conditions can be set in the same manner as in Step S110 described above. As described above, also in this case, for example, by adjusting the output by the attenuator 550 in Step S207, setting the reflective spatial light modulator 410 in Step S209, and changing the oscillation mode in Step S211, the measurement laser light L is generated from a light source common to the processing laser light L, and the measurement laser light L is emitted to the object to be processed 1 along the same optical axis as the processing laser light L.

Subsequently, the laser output unit 300 is turned off, and the emission of the measurement laser light L to the back surface 1b is stopped (Step S212). Thus, the reflected light of the measurement laser light L does not enter the observation camera 488. Subsequently, thus, background is acquired based on the image taken by the observation camera 488 when the reflected light of the measurement laser light L is not input to the observation camera 488 (Step S213).

Then, the laser output unit 300 is turned on again, and the application of the laser light L to the back surface 1b is started (Step S214). Thus, the reflected light of the laser light L on the back surface 1b enter the observation camera 488. In this state, a second image is acquired by imaging the reflected light of the laser light L on the back surface 1b with the observation camera 488 (Step S215). Then, a luminance value of the reflected light of the laser light L on the back surface 1b is acquired by the image processing of the second image (Step S216). At this time, background correction may be performed using the background acquired in Step S213.

In this case, similarly to Step S115 described above, the sum of the luminance values in the aperture (region of the second image corresponding to one region of the first image) in the second image is acquired, and is normalized by the exposure time, so that the first light amount is acquired as the reflected light amount of the measurement laser light L on the back surface 1b. That is, in this case, a first light amount $I_s$ is acquired by calculating first light amount $I_s$=(total sum of luminance values in aperture)/(exposure time). As an example, when the sum of the luminance values in the aperture is $9.06 \times 10^3$ and the exposure time is 5 [ms], the first light amount $I_s$ is $1.81 \times 10^3$ [l/ms].

Figure 28:
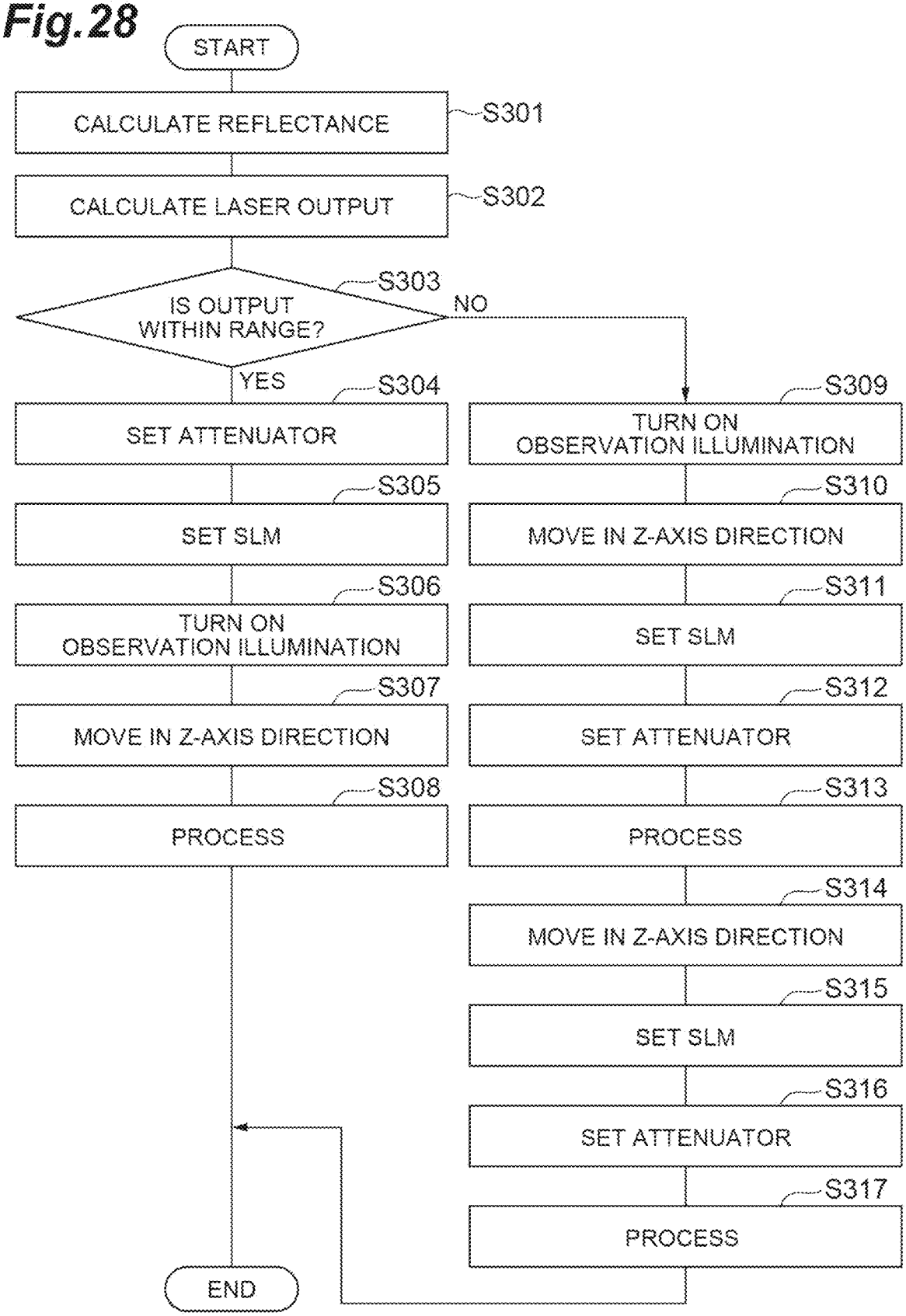
FIG. 28 is a flowchart showing a third step and a fourth step of the laser processing method.

FIG. 28 is a flowchart showing the third step and the fourth step of the laser processing method according to the present embodiment. As illustrated in FIG. 28, in the third step, first, the reflectance of the back surface 1b which is the laser light entrance surface of the object to be processed 1 is calculated (Step S301). More specifically, in this case, after the first step and the second step, a reflectance $R_s$ of the back surface 1b for the first wavelength is calculated based on a reflectance $R_{ref}$ of the reference wafer 1R, the reference light amount $I_{ref}$, and the first light amount $I_s$. That is, the calculation is performed such that reflectance $R_s$ of back surface 1b=reflectance $R_{ref}$ of reference surface 1Rb×(first light amount $I_s$/reference light amount $I_{ref}$). As an example, when the reflectance $_{Ref}$ is 31.4%, the first light amount $I_s$ is $1.81 \times 10^3$ [l/ms], and the reference light amount $I_{ref}$ is $1.39 \times 10^4$ [l/ms], the reflectance $R_s$ is obtained relatively as about 4.1%. This relative value is substantially equal to 4.0%, which is a value calculated from a refractive index of 1.5 at the first wavelength of the back surface 1b.

Subsequently, in the fourth step, as described above, while the emitting condition of the processing laser light L is adjusted according to the reflectance $R_s$ of the back surface 1b calculated in the third step, the processing laser light L is emitted from the back surface 1b side to the object to be processed 1 under the adjusted emitting condition, whereby the modified region 7 is formed at least inside the object to be processed 1.

Thus, in this case, first, the output of the laser light L is calculated as the emitting condition of the laser light L (Step S302). More specifically, in the bifocal processing mode, an output $L_{s2}$ of the laser light L of the post-stage of the attenuator 550 in the case of processing the object to be processed 1 is obtained as the output $L_{s2}=L_{ref2} \times (1-R_{ref})/(1-R_s)$, using the output $L_{ref2}$ of the laser light L of the post-stage of the attenuator 550 in the case of processing the reference wafer 1R and the reflectance $R_s$ and the reflectance $R_{ref}$ described above (see (a) of FIG. 25).

Subsequently, it is determined whether or not the calculated output $L_{s2}$ is within a setting range of the attenuator 550 (Step S303). As a result of the determination in Step S303, if the output $L_{s2}$ is within the setting range of the attenuator 550 (Step S303: YES), a set value of the attenuator 550 is set so that the output $L_{s2}$ can be output (Step S304). That is, the emitting condition of the processing laser light L is adjusted by the attenuator 550.

Subsequently, by setting the reflective spatial light modulator 410, a pattern for splitting the laser light L into the laser lights L1 and L2 is displayed on the reflective spatial light modulator 410 for the bifocal processing mode (Step S305). Subsequently, similar to Step S102 in the first step and Step S202 in the second step, the observation illumination is turned on (Step S306). Subsequently, the laser converging unit 400 is moved in the Z-axis direction such that the converging point P1 of the laser light L1 and the converging point P2 of the laser light L2 each have a desired processing depth (Step S307). Then, by turning on the laser output unit 300 and emitting the laser lights L1 and L2 from the back surface 1b side to the object to be processed 1 under the adjusted emitting condition, laser processing is performed to form the modified regions 7a and 7b at least inside the object to be processed 1 (S308), and the process ends.

On the other hand, as a result of the determination in Step S303, if the output $L_{s2}$ is outside the setting range of the attenuator 550 (Step S303: NO), that is, if the output $L_{s2}$ obtained cannot be set in the bifocal processing mode even if the attenuator 550 is maximized, the processing mode is set to the monofocal processing mode (see (b) of FIG. 25), and the subsequent steps are performed.

That is, first, similar to Step S102 in the first step and Step S202 in the second step, the observation illumination is turned on (Step S309). Subsequently, the laser converging unit 400 is moved in the Z-axis direction so that the converging point P of the processing laser light L can be positioned at a processing depth (see (b) of FIG. 25) of the modified region 7a in the first row (Step S310). Subsequently, a modulation pattern is input to the reflective spatial light modulator 410 such that one converging point P is formed at the processing depth of the modified region 7a in the first row (Step S311).

Subsequently, the setting value of the attenuator 550 at the time of forming the modified region 7a in the first row is determined (Step S312). More specifically, the setting value of the attenuator 550 is determined so that an output $L_{s1}$ of the post-stage of the attenuator 550 of the laser light L is the output $L_{s1}=((L_{reflower})/(1-Loss_1))\times((1-R_{ref})/(1-R_s))$ (see (b) of FIG. 16), using an output $L_{reflower}$ of the laser light L at the processing depth of the modified region 7a in the first row with respect to the reference wafer 1R, an energy loss $Loss_1$ from the attenuator 550 to the converging lens unit 430, and the reflectance $R_s$ and the reflectance $R_{ref}$ described above. That is, in this case, using the attenuator 550, the output is adjusted as the emitting condition of the laser light L according to the reflectance $R_s$ of the back surface 1b.

Then, by emitting the laser light L from the back surface 1b side to the object to be processed 1 under the adjusted emitting condition (output), laser processing is performed to form the modified region 7a at least inside the object to be processed 1 (Step S313).

Subsequently, the laser converging unit 400 is moved in the Z-axis direction so that the converging point P of the processing laser light L can be positioned at a processing depth (see (b) of FIG. 25) of the modified region 7b in the second row (Step S314). Subsequently, a modulation pattern is input to the reflective spatial light modulator 410 such that one converging point P is formed at the processing depth of the modified region 7b in the second row (Step S315).

Subsequently, the setting value of the attenuator 550 at the time of forming the modified region 7b in the second row is determined (Step S316). More specifically, the setting value of the attenuator 550 is determined so that the output $L_{s1}$ of the post-stage of the attenuator 550 of the laser light L is the output $L_{s1}=((L_{refupper})/(1-Loss_1))\times((1-R_{ref})/(1-R_s))$ (see (b) of FIG. 16), using an output $L_{refupper}$ of the laser light L at the processing depth of the modified region 7b in the second row with respect to the reference wafer 1R, the energy loss $Loss_1$ from the attenuator 550 to the converging lens unit 430, and the reflectance $R_s$ and the reflectance $R_{ref}$ described above. That is, in this case, using the attenuator 550, the output is adjusted as the emitting condition of the processing laser light L according to the reflectance $R_s$ of the back surface 1b.

Then, by emitting the laser light L from the back surface 1b side to the object to be processed 1 under the adjusted emitting condition (output), laser processing is performed to form the modified region 7b at least inside the object to be processed 1 (Step S313), and the process ends.

[Operations and Effects of Laser Processing Device]

In the laser processing device 200, the controller 500 executes acquisition processing of irradiating the back surface 1b of the object to be processed 1 with the laser light L under the control of the laser oscillator 310 and imaging the reflected light LL of the laser light L under the control of the observation camera 488 to acquire the reflectance of the back surface 1b with respect to the laser light L. At this time, the controller 500 executes modulation processing for causing the reflective spatial light modulator 410 to present the modulation pattern for lowering the power density of the laser light L on the back surface 1b. As described above, in the laser processing device 200, the power density of the laser light L is lowered by using the reflective spatial light modulator 410 in the acquisition of the reflectance. Thus, it is possible to acquire the reflectance while suppressing damage to the object to be processed 1.

In the laser processing device 200, as the modulation processing, the controller 500 can cause the reflective spatial light modulator 410 to present the shift pattern SP, which is the modulation pattern for shifting the converging point P from the back surface 1b. At this time, when the controller 500 moves the support table 230 by the second moving mechanism 240 so that when the converging point P is shifted from the back surface 1b, the reflected light LL from the back surface 1b is converged to the observation camera 488. In this case, it is possible to suppress the lowering of the power density of the reflected light LL on the observation camera 488 while lowering the power density of the laser light L on the back surface 1b.

As the modulation processing, In the laser processing device 200, the controller 500 can cause the reflective spatial light modulator 410 to present the spot deformation pattern SD, which is the modulation pattern for changing the spot shape of the laser light L on the back surface 1b. In this case, it is possible to lower the power density of the laser light L on the back surface 1b while suppressing the difference between the state of the spot S1 of the laser light L on the back surface 1b and the state of the spot Sc of the reflected light LL on the observation camera 488.

The above embodiment describes an embodiment of the laser processing device according to one aspect of the present disclosure. Therefore, the laser processing device according to one aspect of the present disclosure is not limited to the laser processing device 200 described above, and may be arbitrarily modified.

For example, the controller 500 can cause the reflective spatial light modulator 410 to present the modulation pattern so that the spot shapes of the laser lights L are different between the case (second processing) of acquiring the amount of the reflected light LR on the reference surface 1Rb and the case (first processing) of acquiring the amount of the reflected light LL on the back surface 1b of the object to be processed 1. Thus, a suitable spot shape can be realized according to the reflectance of each surface. As a result, a dynamic range of measurable reflectance can be expanded.

More specifically, first, a suitable exposure time of a camera (for example, observation camera 488) is limited to 0.1 ms to 10 ms, for example. This is because if the exposure time is too short, there is a concern about accuracy of an electronic shutter speed, and if the exposure time is too long, noise may become a problem. In the case of normal converging (in the case of Gaussian beam), the dynamic range of the measurable reflectance is proportional to the dynamic range of the camera, and is 10 ms/0.1 ms=$1\times10^2$. On the other hand, when normal converging is performed on the reference wafer 1R and the Laguerre Gaussian beam LG2 in which the peak value of the power density is 1/10 is used for the object to be processed 1 having a relatively high reflectance, the dynamic range of the measurable reflectance is 10 ms/(0.1 ms/10)=$1\times10^3$, which is expanded.

The following method can be considered as a measure against the dynamic range of a camera. That is, in the above embodiment, the controller 500 calculates the reflectance $R_{ref}\times$(first light amount $I_s$/reference light amount $I_{ref}$) using the reference light amount $I_{ref}$ and the first light amount $I_s$, whereby the reflectance $R_s$ is calculated. The reference light amount $I_{ref}$ is (sum $SV_r$ of luminance values in aperture)/(exposure time $T_r$), and the first light amount $I_s$ is (sum $SV_s$ of luminance values in aperture)/(exposure time $T_s$).

On the other hand, when the power of the laser light L is a measured power $P_r$ in acquisition of the reference light amount $I_{ref}$, and when the power of the laser light L is a measured power $P_s$ in acquisition of the first light amount $I_s$, the reflectance $R_{ref}$ can be calculated by calculating the reflectance $R_s\times$(measured power $P_r$/measured power $P_s$)$\times$(first light amount $I_s$/reference light amount $I_{ref}$). Consequently, the measurable dynamic range of the reflectance limited by the dynamic range of the camera can be expanded.

In the above embodiment, although the reference wafer 1R which is a Si wafer is illustrated as a reference object, the reference object is not limited to Si, and the shape of the reference object is not limited to a wafer shape. Although the observation camera 488 is used as a camera, another camera may be used. Although the bifocal processing mode is illustrated, the present invention is not limited to the bifocal point, but can be emitted to any multifocal processing mode.

INDUSTRIAL APPLICABILITY

Provided is a laser processing device capable of acquiring a reflectance while suppressing damage to an object to be processed.

REFERENCE SIGNS LIST

1 Object to be processed
1*b* Back surface (first surface)
1R Reference wafer (reference object)
1Rb Reference surface
100, 200 Laser processing device
230 Support table
240 Second moving mechanism (moving mechanism)
310 Laser oscillator (laser light source)
410 Reflective spatial light modulator (spatial light modulator)
430 Converging lens unit
488 Observation camera (camera)
500 Controller
L Laser light
P Converging point

The invention claimed is:

1. A laser processing device for performing laser processing on an object to be processed by applying laser light of a first wavelength from a first surface side of the object to be processed to the object to be processed, the laser processing device comprising:
a laser light source configured to output the laser light;
a converging unit configured to converge the laser light toward the first surface to form a converging point;
a camera configured to image reflected light of the laser light from the first surface;
a spatial light modulator configured to modulate the laser light according to a modulation pattern;
a support table configured to support the object to be processed;
a moving mechanism for moving the support table;
a converging lens for converging the reflected light toward the camera; and
a controller configured to execute acquisition processing of applying the laser light to the first surface by controlling the laser light source and imaging the reflected light by controlling the camera to acquire a reflectance of the first surface with respect to the first wavelength,
wherein before executing the acquisition processing, the controller executes modulation processing of causing the spatial light modulator to present the modulation pattern for lowering a power density of the laser light on the first surface,
wherein as the modulation processing, the controller causes the spatial light modulator to present a shift pattern as the modulation pattern for shifting the converging point from the first surface,
wherein the controller moves the support table by the moving mechanism so that the reflected light from the first surface is converged to the camera when the converging point is shifted from the first surface,
wherein as the acquisition processing, the controller executes
first processing of imaging the reflected light from the first surface by controlling the camera to acquire a first light amount as an amount of the reflected light from the first surface,
second processing of applying the laser light from a side of a reference surface, of which reflectance for the first wavelength is known, to a reference object having the reference surface by controlling the laser light source and imaging reflected light from the reference surface by controlling the camera to acquire a reference light amount as an amount of the reflected light from the reference surface, and
third processing of calculating a reflectance of the first surface for the first wavelength based on the reflectance of the reference surface for the first wavelength, the first light amount, and the reference light amount,
as the modulation processing, the controller causes the spatial light modulator to present the modulation pattern so that a spot shape of the laser light on the first surface in the first processing is different from a spot shape of the laser light on the reference surface in the second processing, and
wherein the power density is lowered as the spot size of the laser light is expanded based on the modulation pattern.

2. A laser processing device for performing laser processing on an object to be processed by applying laser light of a first wavelength from a first surface side of the object to be processed to the object to be processed, the laser processing device comprising:
a laser light source configured to output the laser light;
a converging unit configured to converge the laser light toward the first surface to form a converging point;
a camera configured to image reflected light of the laser light from the first surface;
a spatial light modulator configured to modulate the laser light according to a modulation pattern; and
a controller configured to execute acquisition processing of applying the laser light to the first surface by controlling the laser light source and imaging the reflected light by controlling the camera to acquire a reflectance of the first surface with respect to the first wavelength,
wherein before executing the acquisition processing, the controller executes modulation processing of causing the spatial light modulator to present the modulation pattern for lowering a power density of the laser light on the first surface,
wherein as the modulation processing, the controller causes the spatial light modulator to present a spot deformation pattern as the modulation pattern for changing a spot shape of the laser light on the first surface,
wherein the power density is lowered as the spot size of the laser light is expanded based on the spot deformation pattern,
wherein as the acquisition processing, the controller executes
first processing of imaging the reflected light from the first surface by controlling the camera to acquire a first light amount as an amount of the reflected light from the first surface,
second processing of applying the laser light from a side of a reference surface, of which reflectance for the first wavelength is known, to a reference object having the reference surface by controlling the laser light source and imaging reflected light from the reference surface by controlling the camera to acquire a reference light amount as an amount of the reflected light from the reference surface, and third processing of calculating a reflectance of the first surface for the first wavelength based on the reflectance of the reference surface for the first wavelength, the first light amount, and the reference light amount, as the modulation processing, the controller causes the spatial light modulator to present the modulation pattern so that a spot shape of the laser light on the first surface in the first processing is different from a spot shape of the laser light on the reference surface in the second processing, and wherein the power density is lowered as the spot size of the laser light is expanded based on the modulation pattern.

* * * * *